United States Patent
Lawson et al.

(10) Patent No.: US 10,018,993 B2
(45) Date of Patent: Jul. 10, 2018

(54) TRANSFORMATION OF INDUSTRIAL DATA INTO USEFUL CLOUD INFORMATION

(71) Applicant: Rockwell Automation Technologies, Inc., Mayfield Heights, OH (US)

(72) Inventors: Douglas C. Lawson, Silverado, CA (US); Douglas J. Reichard, Fairview Park, OH (US); Joseph A. Harkulich, Willoughby, OH (US); Rainer Hessmer, Rancho Santa Margarita, CA (US); Sujeet Chand, Brookfield, WI (US); David W. Farchmin, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/206,744

(22) Filed: Jul. 11, 2016

(65) Prior Publication Data

US 2016/0323392 A1 Nov. 3, 2016

Related U.S. Application Data

(63) Continuation of application No. 13/608,850, filed on Sep. 10, 2012.
(Continued)

(51) Int. Cl.
*G06F 15/16* (2006.01)
*G05B 19/418* (2006.01)
(Continued)

(52) U.S. Cl.
CPC .......... *G05B 19/4185* (2013.01); *G05B 11/01* (2013.01); *G06F 1/12* (2013.01);
(Continued)

(58) Field of Classification Search
CPC ....................................................... H04L 67/42
(Continued)

(56) References Cited

U.S. PATENT DOCUMENTS 5,014,317 A 5/1991 Kita et al.
5,122,948 A 6/1992 Zapolin
(Continued)

FOREIGN PATENT DOCUMENTS

CN 101114160 1/2008
CN 101536002 9/2009
(Continued)

OTHER PUBLICATIONS

Non-Final Office Action for U.S. Appl. No. 14/087,821 dated Mar. 2, 2016, 86 pages.
(Continued)

*Primary Examiner* — Karen Tang
(74) *Attorney, Agent, or Firm* — Amin, Turocy & Watson, LLP

(57) ABSTRACT

A cloud-compatible industrial device is provided. The industrial device generates or collects raw industrial data in connection with monitoring and/or controlling an automation system, and includes a cloud interface that couples the industrial device to one or more cloud-based services running on a cloud platform. To reduce consumption of cloud-based resources such as bandwidth and storage utilization, the industrial device can transform the raw industrial data into refined data that is amenable for cloud-based storage, computing, or analysis. Exemplary transformations include filtering, pruning, re-formatting, compressing, summarizing. In one or more embodiments, the industrial device can also add contextual metadata to the raw data prior to delivery to the cloud.

20 Claims, 18 Drawing Sheets

Related U.S. Application Data

(60) Provisional application No. 61/587,531, filed on Feb. 9, 2012.

(51) Int. Cl.

| | | |
|---|---|---|
| *G05B 11/01* | (2006.01) | |
| *G06F 17/30* | (2006.01) | |
| *H04L 29/06* | (2006.01) | |
| *H04L 29/08* | (2006.01) | |
| *G06F 1/12* | (2006.01) | |
| *G06F 1/14* | (2006.01) | |
| *G06F 9/50* | (2006.01) | |
| *G06N 7/00* | (2006.01) | |
| *H04L 12/24* | (2006.01) | |

(52) U.S. Cl.
CPC ............. *G06F 1/14* (2013.01); *G06F 9/5072* (2013.01); *G06F 17/30233* (2013.01); *G06F 17/30545* (2013.01); *G06F 17/30554* (2013.01); *G06F 17/30867* (2013.01); *G06N 7/005* (2013.01); *H04L 41/12* (2013.01); *H04L 67/02* (2013.01); *H04L 67/10* (2013.01); *H04L 67/12* (2013.01); *H04L 67/16* (2013.01); *H04L 67/18* (2013.01); *H04L 67/42* (2013.01); *G05B 2219/31326* (2013.01); *G05B 2219/31334* (2013.01); *G05B 2219/33139* (2013.01); *Y02P 80/114* (2015.11); *Y02P 90/14* (2015.11); *Y02P 90/16* (2015.11); *Y02P 90/18* (2015.11); *Y02P 90/185* (2015.11); *Y02P 90/20* (2015.11)

(58) Field of Classification Search
USPC ........................................................ 709/217
See application file for complete search history.

(56) References Cited

U.S. PATENT DOCUMENTS

| | | |
|---|---|---|
| 5,199,009 A | 3/1993 | Svast |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,978,568 A | 11/1999 | Abraham et al. |
| 6,167,337 A | 12/2000 | Haack et al. |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,535,926 B1 | 3/2003 | Esker |
| 6,578,005 B1 | 6/2003 | Lesaint et al. |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,705,229 B2 | 3/2004 | Frankenberger |
| 6,708,074 B1 | 3/2004 | Chi et al. |
| 6,708,385 B1 | 3/2004 | Lemelson |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,774,598 B1 | 8/2004 | Kohler et al. |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,952,680 B1 | 10/2005 | Melby et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,242,009 B1 | 7/2007 | Wilson et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,478,010 B2 | 1/2009 | Hashemian |
| 7,480,728 B2 | 1/2009 | Evans |
| 7,539,724 B1 | 5/2009 | Callaghan |
| 7,734,590 B2 | 6/2010 | Chand et al. |
| 8,150,959 B1 | 4/2012 | Bezdicek et al. |
| 8,266,066 B2 | 9/2012 | Wezter et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,686,871 B2 | 4/2014 | Jensen et al. |
| 8,924,328 B1 | 12/2014 | Kozlovsky et al. |
| 9,024,955 B2 | 5/2015 | Ramarao et al. |
| 9,117,076 B2 | 8/2015 | Devost |
| 9,438,648 B2 | 9/2016 | Asenjo et al. |
| 9,507,807 B1* | 11/2016 | Florissi ............. G06F 17/30286 |
| 9,690,669 B2 | 6/2017 | Bernal et al. |
| 2002/0004798 A1 | 1/2002 | Babula et al. |
| 2002/0016839 A1 | 2/2002 | Smith |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0068984 A1 | 6/2002 | Alexander et al. |
| 2002/0073236 A1 | 6/2002 | Helgeson et al. |
| 2002/0077711 A1 | 6/2002 | Nixon et al. |
| 2002/0082966 A1 | 6/2002 | O'Brien et al. |
| 2002/0094588 A1 | 7/2002 | Fan et al. |
| 2002/0107904 A1 | 8/2002 | Talluri et al. |
| 2002/0138378 A1 | 9/2002 | Leskuski |
| 2002/0156872 A1 | 10/2002 | Brown |
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0041089 A1 | 2/2003 | Mauro |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1 | 6/2003 | Ukita |

(56) References Cited

U.S. PATENT DOCUMENTS

| | | |
|---|---|---|
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves |
| 2004/0159113 A1 | 8/2004 | Singh et al. |
| 2004/0199573 A1 | 10/2004 | Schwartz et al. |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0038528 A1 | 2/2005 | McKelvey et al. |
| 2005/0055429 A1 | 3/2005 | Abele et al. |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2006/0022048 A1 | 2/2006 | Johnson |
| 2006/0046712 A1 | 3/2006 | Shamp et al. |
| 2006/0077095 A1 | 4/2006 | Tucker et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0078525 A1 | 4/2007 | Chand |
| 2007/0078536 A1* | 4/2007 | Gordon ................ G05B 19/409 700/83 |
| 2007/0078862 A1* | 4/2007 | Chand ................ G05B 19/4188 |
| 2007/0112801 A1* | 5/2007 | McGreevy ............ G06Q 10/06 |
| 2007/0118560 A1 | 5/2007 | Bomhoevd et al. |
| 2007/0130112 A1* | 6/2007 | Lin ................ G06F 17/3002 |
| 2007/0192213 A1 | 8/2007 | Wu et al. |
| 2007/0194097 A1 | 8/2007 | Jones |
| 2007/0244892 A1* | 10/2007 | Narancic ............ G06F 17/30569 |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0027704 A1 | 1/2008 | Kephart et al. |
| 2008/0065243 A1 | 3/2008 | Fallman et al. |
| 2008/0077512 A1 | 3/2008 | Grewal |
| 2008/0082186 A1* | 4/2008 | Hood ................ G05B 19/042 700/83 |
| 2008/0125887 A1 | 5/2008 | Case |
| 2008/0155064 A1 | 6/2008 | Kosuge et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0263514 A1 | 10/2008 | DeMesa et al. |
| 2009/0037872 A1* | 2/2009 | Schnabele ........... G05B 19/4183 717/105 |
| 2009/0063258 A1 | 3/2009 | Mueller et al. |
| 2009/0083204 A1* | 3/2009 | Baier ................ G06F 11/3013 706/45 |
| 2009/0086692 A1 | 4/2009 | Chen |
| 2009/0088875 A1 | 4/2009 | Baier et al. |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0082127 A1* | 4/2010 | Plache ................ G06F 9/5044 700/79 |
| 2010/0082129 A1 | 4/2010 | McGreevy et al. |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0118895 A1 | 5/2010 | Radulescu |
| 2010/0146014 A1* | 6/2010 | Ionescu ................ G06Q 10/06 707/810 |
| 2010/0153487 A1 | 6/2010 | Greven et al. |
| 2010/0192144 A1 | 7/2010 | Schmit |
| 2010/0211509 A1 | 8/2010 | Jacobs |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0078300 A9 | 3/2011 | Grelewicz et al. |
| 2011/0161378 A1* | 6/2011 | Williamson ...... G06F 17/30961 707/812 |
| 2011/0173127 A1* | 7/2011 | Ho ........................ G06Q 10/00 705/317 |
| 2011/0276498 A1 | 11/2011 | Madhok |
| 2012/0005242 A1 | 1/2012 | Feng et al. |
| 2012/0054246 A1 | 3/2012 | Fischer |
| 2012/0072597 A1 | 3/2012 | Teather et al. |
| 2012/0079461 A1* | 3/2012 | Copass ............. G05B 19/0426 717/136 |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0101801 A1 | 4/2012 | Van Dorsselaer |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |

(56) References Cited

U.S. PATENT DOCUMENTS

| | | |
|---|---|---|
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0212420 A1 | 8/2013 | Lawson et al. |
| 2013/0218971 A1 | 8/2013 | Sasaki et al. |
| 2013/0257627 A1 | 10/2013 | Rafael |
| 2013/0283265 A1 | 10/2013 | Acharya et al. |
| 2013/0304237 A1 | 11/2013 | Schroeder et al. |
| 2013/0325545 A1 | 12/2013 | Mordvinova et al. |
| 2014/0013100 A1 | 1/2014 | Menzel et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0095654 A1 | 4/2014 | Finnerty et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0279641 A1 | 9/2014 | Singh et al. |
| 2014/0279948 A1 | 9/2014 | Mahate et al. |
| 2014/0306533 A1 | 10/2014 | Paquin et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0304193 A1 | 10/2015 | Ishii et al. |
| 2015/0378356 A1 | 12/2015 | Hefeeda et al. |
| 2016/0217410 A1 | 7/2016 | Santos et al. |

FOREIGN PATENT DOCUMENTS

| | | |
|---|---|---|
| CN | 101739007 | 6/2010 |
| CN | 102449567 | 5/2012 |
| CN | 102927937 | 2/2013 |
| CN | 103019102 | 4/2013 |
| DE | 19834456 | 2/2000 |
| EP | 1209558 | 5/2002 |
| EP | 1531373 | 5/2005 |
| EP | 1686442 | 8/2006 |
| EP | 1933214 | 6/2008 |
| EP | 2189900 | 5/2010 |
| EP | 2293164 | 3/2011 |
| EP | 2453326 | 5/2012 |
| EP | 2469466 | 6/2012 |
| EP | 2801938 | 11/2014 |
| EP | 2801940 | 11/2014 |
| EP | 2801941 | 11/2014 |
| WO | 0111586 | 2/2001 |
| WO | 0169329 | 9/2001 |
| WO | 0217131 | 2/2002 |
| WO | 03058506 | 7/2003 |
| WO | 2008133715 | 11/2008 |
| WO | 2009046095 | 4/2009 |
| WO | 2011050482 | 5/2011 |
| WO | 2013007866 | 1/2013 |

OTHER PUBLICATIONS

Non-Final Office Action for U.S. Appl. No. 14/087,977 dated Mar. 17, 2016, 83 pages.
Recursion Software, "SCADA-Aware Mobile", Frisco, TX, Aug. 29, 2012 (accessed from hftp://www.emsenergyautomation.com/brochures/scada.pdf on Feb. 11, 2016).
Ars Technica, "Windows 7 themes: how to unlock them or create your own", Nov. 12, 2009 (accessed from http://arstechnica.com/information-technology/2009/11/unlock-hidden-windows-7-themesl on Mar. 8, 2016).
Non-Final Office Action for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth= 1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196198.5 dated Mar. 29, 2016, 18 pages.
Non-Final Office Action for U.S. Appl. No. 14/088,011 dated May 12, 2016, 96 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016, 13 pages.
Chinese Office Action for Chinese Application No. 201410196775.0 dated May 5, 2016, 14 pages.
Chinese Office Action for Chinese Application No. 201410196525.7 dated May 5, 2016, 13 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Chinese Office Action for Chinese Application No. 201410196114.8 dated Apr. 25, 2016, 20 pages.
Office Action dated Sep. 22, 2015 for European Application No. 14167707.0-1955, 9 pages.
Chinese Office Action dated May 26, 2016 for Chinese Application No. 201410195780.X, 16 pages.
European Search Report dated Aug. 11, 2014 for European Application No. 14167714.6-1955, 5 pages.
European Search Report dated Aug. 11, 2014 for European Application No. 14167706.2-1955, 7 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, a Web Services Primer, Apr. 4, 2001, XML.com, http://webservices.xml.com/pub/a/ws/2001/04/04/webservices/index.html.
Office Action dated Mar. 6, 2006 for U.S. Appl. No. 10/162,315, 8 pages.

(56) References Cited

OTHER PUBLICATIONS

W3C, Web Services Description Language, http://www.w3.orgr/TR/wsd1, Mar. 15, 2001, 36 pages.
European Search Report dated Mar. 18, 2004 for European Patent Application Serial No. 03026339, 3 pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002.
Office Action dated Jun. 18, 2014 for U.S. Appl. No. 13/725,578, 13 pages.
Office Action dated Aug. 19, 2014 for U.S. Appl. No. 13/615,195, 22 pages.
Office Action dated Oct. 9, 2014 for U.S. Appl. No. 13/725,543, 10 pgs.
Office Action dated Dec. 12, 2014 for U.S. Appl. No. 13/725,578, 24 pages.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo, Amanda Walter, et al., "Towards the Factory of the Future: A Service-Oriented Cross-layer Infrastructure," ICT Shaping the World: A Scientific View, 2009, pp. 65-81.
Notice of Allowance for U.S. Appl. No. 13/725,578, dated Apr. 24, 2015, 23 pages.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21, 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Office Action for U.S. Appl. No. 14/658,365, dated Mar. 23, 2017, 100 pages.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 14/658,394, dated Apr. 21, 2017, 97 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Examiner Answer to Appeal Brief for U.S. Appl. No. 14/087,977, dated Feb. 1, 2017.
Givehchi, et al., "Control-as-a-Service from the Cloud: A Case Study for using Virtualized PLCs," 2014 10th IEEE Workshop on Factory Communication Systems (WFCS 2014), 20140505 IEEE, 4 pages.
Office Action for U.S. Appl. No. 14/088,011, dated May 17, 2017.
Rouse, et al. "Definition Industrial Control System (ICS," whatis.techtarget.com, ed. Mar. 2016 (accessed from <<http://whatis.techtarget.com/definition/industrial-control-system-ICS>> on Jan. 11, 2017).
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
European Office Action for EP Patent Application Serial No. 16160610.8, dated Oct. 17, 2016, 2 pages.
Final Office Action for U.S. Appl. No. 14/658,365 dated Sep. 8, 2017, 59 pages.
Office Action for U.S. Appl. No. 14/087,821 dated Sep. 7, 2017, 63 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.

(56) References Cited

OTHER PUBLICATIONS

Final Office Action for U.S. Appl. No. 14/658,345 dated Sep. 25, 2017, 52 pages.
Final Office Action for U.S. Appl. No. 15/388,260 dated Oct. 18, 2017, 76 pages.
Office Action for U.S. Appl. No. 14/658,327 dated Oct. 30, 2017, 48 pages.
Final Office Action for U.S. Appl. No. 14/658,394 dated Nov. 16, 2017, 49 pages.
Office Action for European Patent Application Serial No. 16160604.1-1802, dated May 17, 2017, 6 pages.
Extended European Search Report for European Patent Application Serial No. 16160604.1, dated Aug. 17, 2016, 9 pages.
Final Office Action for U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Extended European Search Report for EP Patent Application Serial No. 16160611.6, dated Aug. 24, 2016, 10 pages.
Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
Non-Final Office Action for U.S. Appl. No. 14/087,835, dated Sep. 23, 2016, 82 pages.
Final Office Action for U.S. Appl. No. 14/087,821, dated Sep. 9, 2016, 97 pages.
Extended European Search Report for EP Patent Application Serial No. 13166670.3, dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
Non-Final Office Action for U.S. Appl. No. 14/087,730, dated Feb. 9, 2017, 78 pages.
Chinese Office Action for CN Application Serial No. 201410198289.2, dated Dec. 15, 2016, 21 pages.
Chinese Office Action for CN Application Serial No. 201410195780.X, dated Feb. 3, 2017, 18 pages.
Chinese Office Action for CN Application Serial No. 201410196127.5, dated Nov. 30, 2016, 13 pages.
Office Action for U.S. Appl. No. 14/087,970 dated Feb. 12, 2018, 69 pages.
Chinese Office Action for CN Application Serial No. 201410196114.8, dated Dec. 13, 2017, 26 pages.
Office Action for U.S. Appl. No. 15/143,733 dated Mar. 8, 2018, 141 pages.
Office Action for U.S. Appl. No. 15/490,076 dated Apr. 2, 2018, 23 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,365, dated Apr. 5, 2018, 64 pages.
Office Action for U.S. Appl. No. 14/658,394, dated Apr. 6, 2018, 40 pages.

\* cited by examiner

TRANSFORMATION OF INDUSTRIAL DATA INTO USEFUL CLOUD INFORMATION

CROSS-REFERENCE TO RELATED APPLICATIONS

This application is a continuation of, and claims priority to, U.S. patent application Ser. No. 13/608,850, filed on Sep. 10, 2012, and entitled "TRANSFORMATION OF INDUSTRIAL DATA INTO USEFUL CLOUD INFORMATION," which claims the benefit of U.S. Provisional Patent Application Ser. No. 61/587,531, filed on Feb. 9, 2012, and entitled "INDUSTRIAL AUTOMATION CLOUD COMPUTING SYSTEMS AND METHODS." This application is also related to U.S. patent application Ser. No. 10/162,315, filed on Jun. 4, 2002 (which issued as U.S. Pat. No. 7,151,966 on Dec. 19, 2006), and entitled "SYSTEM AND METHODOLOGY PROVIDING OPEN INTERFACE AND DISTRIBUTED PROCESSING IN AN INDUSTRIAL CONTROLLER ENVIRONMENT." The entireties of these applications are incorporated herein by reference.

TECHNICAL FIELD

The subject application relates generally to industrial automation, and, more particularly, to transformation of industrial data into refined data amenable for cloud-based storage, computing, or analysis.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Unlike general purpose computing devices, industrial automation devices often generate vast amounts of real-time data. This is due in part to the large number of system variables that must be monitored and controlled in real-time for a given automation system. In addition to production statistics, data relating to machine health, alarm statuses, operator feedback (e.g., manually entered reason codes associated with a downtime condition), electrical or mechanical load over time, and the like must be monitored, and in some cases recorded, on a continuous basis. This data is generated by the many industrial devices that can make up a given automation system, including the industrial controller and its associated I/O, telemetry devices for real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities for which data is to be collated, the amount of generated automation data increases even more.

The large quantity of data continuously generated by today's industrial automation systems may render cloud-based storage and analysis of this data cost-prohibitive due to bandwidth, storage, and processing constraints.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to cloud-compatible industrial devices that can transform their stored or generated data into refined data that is amenable for cloud-based storage, computing, analysis, or other cloud-based services. To this end, an industrial device (e.g., industrial controller, sensor, meter, drive, or the like) can include an interface for coupling the device to a web-based cloud, allowing the device to exchange data with cloud-based applications such as data processing tools, storage Services, remote visualization applications, or other cloud-based services. The industrial device can also include a transformation component configured to transform data collected by and/or stored on the industrial device into a refined set of data that can be pushed to the cloud for storage, analysis, etc. while circumventing inherent bandwidth, cost, storage, or processing constraints. Using the transformation component, the industrial device can filter, prune, re-format, combine, summarize, or compress its data prior to moving the data to the cloud. In some embodiments, the industrial device can select a particular transformation based on a determined need or limitation of the cloud or cloud-based application that will consume the data. The industrial device can also receive a request from a cloud-based application for a subset of data to be delivered in a specified format, and transform the requested data to the specified format before sending the data to the cloud.

One or more embodiments can also contextualize data within the industrial devices prior to pushing the data to the cloud. This can include tagging the data with contextual metadata, such as a time, a quality indicator, a production area, a machine or process state, personnel identifications, or other information that provides additional context for the data. This appended contextual data can be leveraged by cloud-based analysis tools, or can be used internally by the industrial device's transformation component in connection with aggregating, filtering, or summarizing the data for cloud-based storage or analysis.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Figure 1:
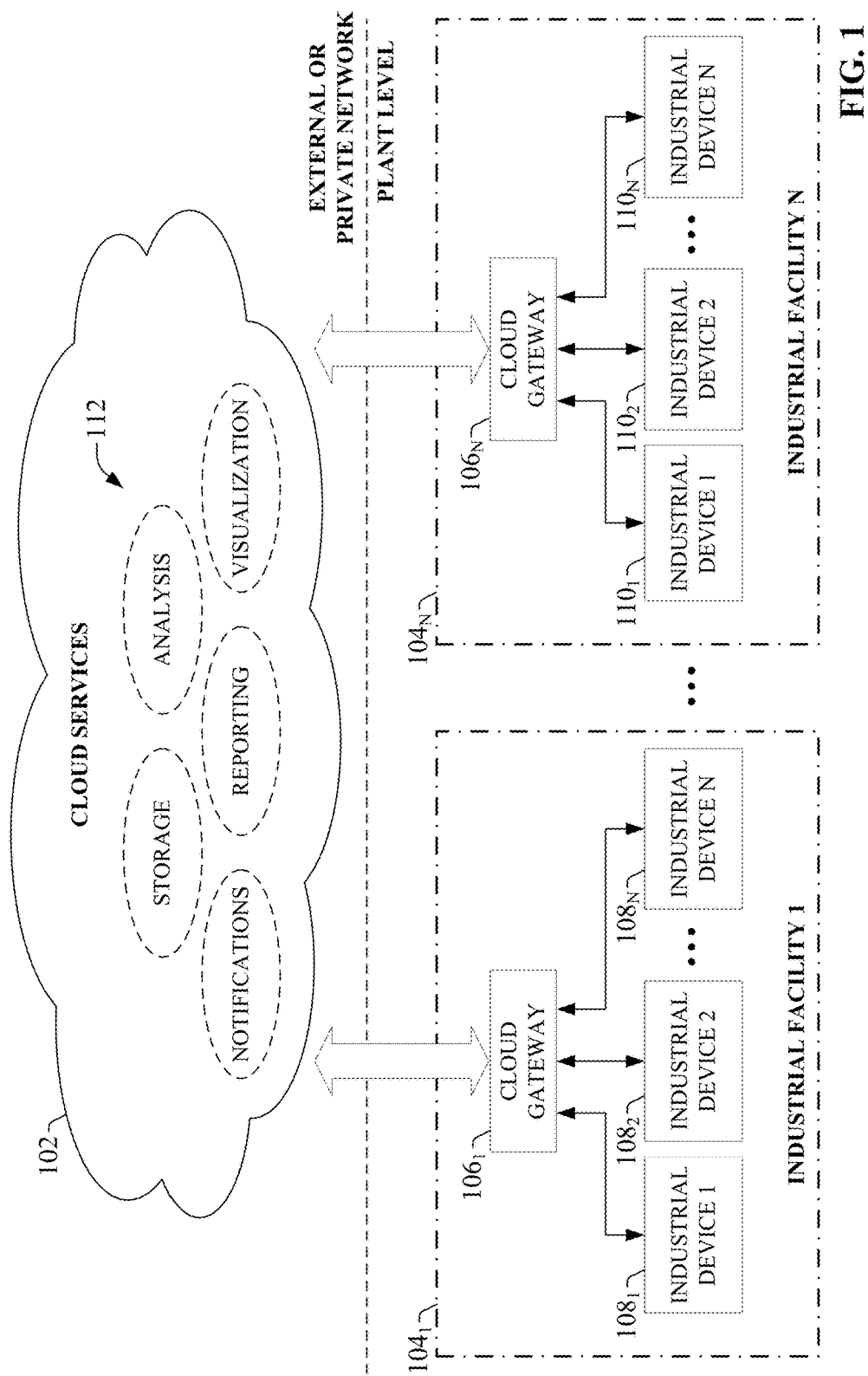
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in stationary industrial facilities 104, the industrial devices may also be part of a mobile control application, such as a system contained in a truck or other service vehicle.

According to one or more embodiments of this disclosure, industrial devices 108 and 110 can be coupled to a cloud platform to leverage cloud-based applications. That is, the industrial device 108 and 110 can be configured to discover and interact with cloud-based computing services 112 hosted by cloud platform 102. Cloud platform 102 can be any infrastructure that allows shared computing services 112 to be accessed and utilized by cloud-capable devices. Cloud platform 102 can be a public cloud accessible via the Internet by devices having Internet connectivity and appropriate authorizations to utilize the services. Alternatively, cloud 102 can be a private cloud operated internally by the enterprise. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), visualization applications such as cloud-based HMIs, reporting applications, Enterprise Resource Planning (ERP) applications, notification services, or other such applications. If cloud platform 102 is a web-based cloud, industrial devices 108 and 110 at the respective industrial facilities 104 may interact with cloud services 112 via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices may access the cloud platform directly using an integrated cloud interface.

Providing industrial devices with cloud capability can offer a number of advantages particular to industrial automation. For one, cloud-based storage offered by the cloud platform can be easily scaled to accommodate the large quantities of data generated daily by an industrial enterprise. Moreover, multiple industrial facilities at different geographical locations can migrate their respective automation data to the cloud for aggregation, collation, collective analysis, and enterprise-level reporting without the need to establish a private network between the facilities. Industrial devices 108 and 110 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

While there are considerable advantages to be gained by leveraging cloud computing in an industrial environment, there are a number of inherent constraints that may impact the ability of an industrial enterprise to take full advantage of the cloud. For example, bandwidth, or the rate at which data can be transferred between the device and the cloud, is a common performance bottleneck associated with cloud computing. Given the large amount of data generated by an industrial enterprise on a continuous basis, the cloud platform provider's maximum bandwidth may limit the speed of data exchange between an automation system and the cloud, resulting in performance delays or rendering some applications impractical. Moreover, the cost of cloud computing to an end user is often a function of the amount of data storage or processing load required. Consequently, the volume of data generated by an industrial enterprise can render cloud-based storage and analysis cost-prohibitive.

Figure 2:
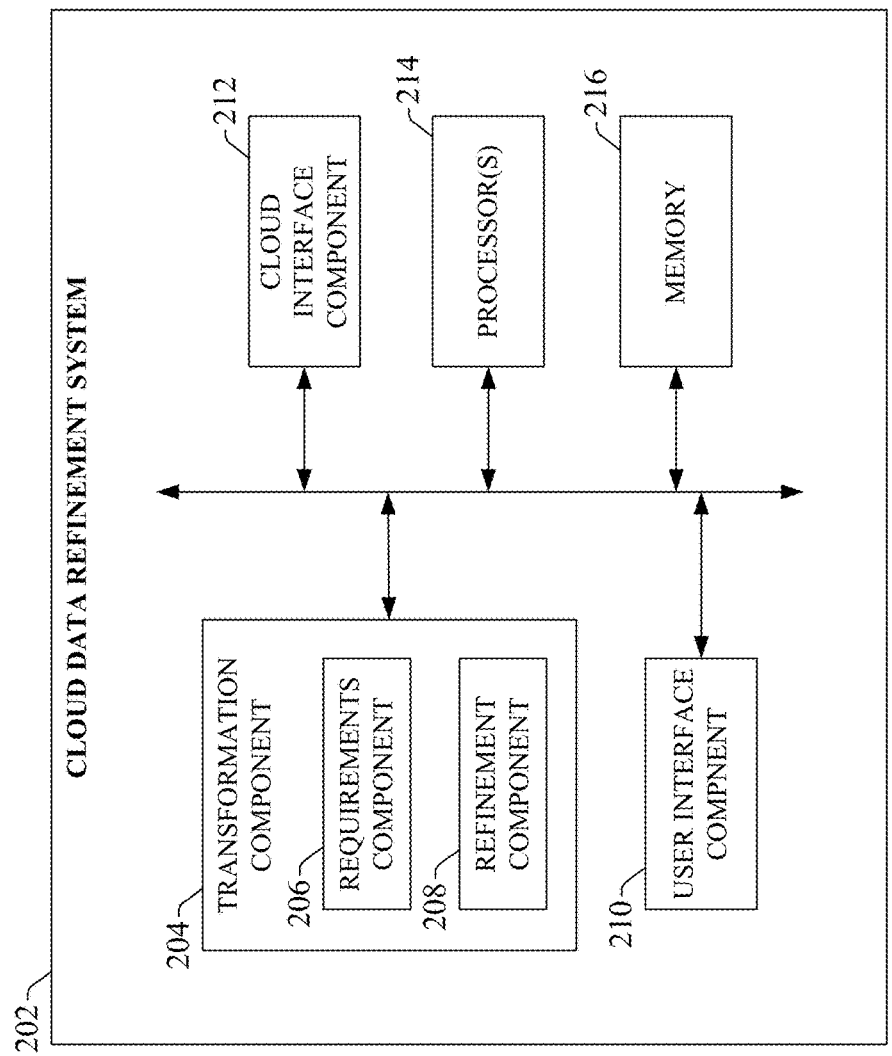
FIG. 2 is a block diagram of an exemplary cloud data refinement system that can be used to transform industrial data to refined data amenable to cloud computing.

To mitigate these constraints, one or more embodiments of the present disclosure incorporates a cloud data refinement system in an industrial device that can transform data collected or generated by the device into refined data that is better suited to cloud-based storage, computing, or analysis. FIG. 2 is a block diagram of an exemplary cloud data refinement system that can be used to transform industrial data to refined data amenable to cloud computing. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud data refinement system 202 can include a transformation component 204 having a requirements component 206 and a refinement component 208, a user interface component 210, a cloud interface component 212, one or more processors 214, and memory 216. In various embodiments, one or more of the transformation component 204, requirements component 206, refinement component 208, user interface component 210, cloud interface component 212, the one or more processors 214, and memory 216 can be electrically and/or communicatively coupled to one another to perform one or more of the functions of the cloud data refinement system 202. In some embodiments, components 204, 206, 208, 210, and 212 can comprise software instructions stored on memory 216 and executed by processor(s) 214. The cloud data refinement system 202 may also interact with other hardware and/or software components not depicted in FIG. 2. For example, processor(s) 214 may interact with one or more external user interface devices, such as a keyboard, a mouse, a display monitor, a touchscreen, or other such interface devices.

User interface component 210 can be configured to receive user input and to render output to the user in any suitable format (e.g., visual, audio, tactile, etc.). User input can be, for example, defined criteria for transforming raw industrial data into refined data for migration to the cloud. As used in this disclosure, the term "raw" data is intended to refer to any industrial data that has not been transformed by transformation component 204. This can include, but is not limited to, data that has been collected, generated, and/or processed by an industrial device (e.g., a programmable logic controller, automation controller, human-machine interface, network infrastructure device, enterprise resource planning system, etc.), data stored on an industrial device or data historian, data generated by field devices (e.g., sensors, meters, etc.), or other such data.

Transform component 204 can be configured to transform raw industrial data in accordance with defined transform profiles associated with an industrial device, which can be configured using input received via the user interface component 210 in some embodiments. To this end, a requirements component 206 can determine one or more requirements for migration of data to the cloud (e.g., a bandwidth or storage limitation, a cost limitation, contextual requirements, a user preference specified in a transform profile, etc.), and refinement component can transform the data in accordance with the determined requirement. Cloud interface component 212 can be configured to couple an industrial device to a web-based or private cloud. In one or more embodiments, the cloud interface component 212 can be configured to automatically provide identification and context information relating to its associated industrial device upon connection to the cloud. This information may be used by some cloud-based applications to facilitate integrating the industrial device and its associated data with the larger plant-level or enterprise-level system. The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

Figure 3:
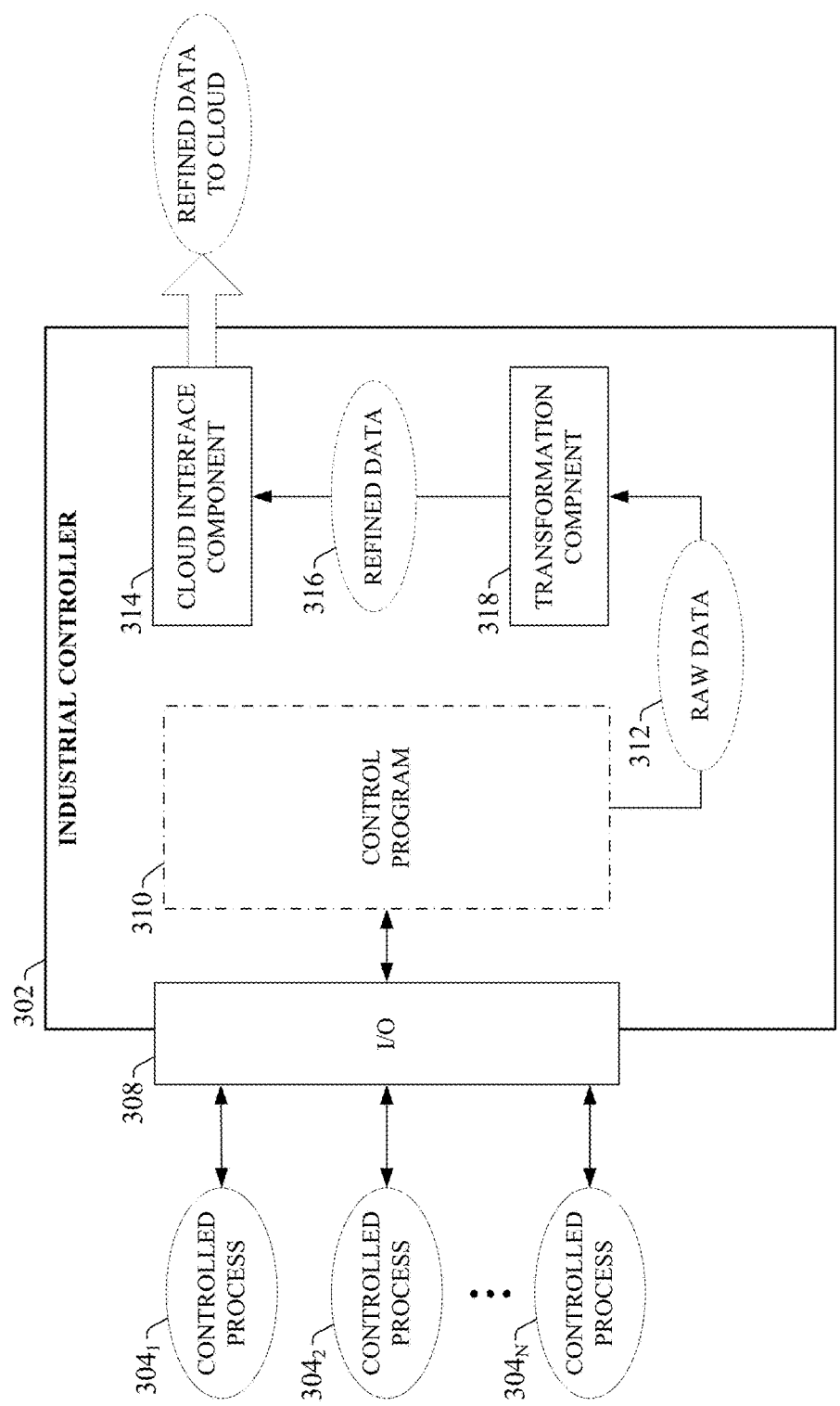
FIG. 3 is a block diagram of an exemplary cloud-capable industrial controller with the capability to transform process data into refined cloud data.

FIG. 3 illustrates an exemplary cloud-capable industrial controller with the capability to transform raw process data into refined cloud data. Industrial controller 302 can be, for example, a programmable logic controller (PLC) or other type of programmable automation controllers (PAC) executing control program 310 to facilitate monitoring and control of one or more controlled industrial processes $304_1$-$304_N$. Control program 310 can be any suitable code used to process input signals read into the controller 302 and to control output signals from the controller 302, including but not limited to ladder logic, sequential function charts, function block diagrams, or structured text. Data read into or generated by controller 302 can be stored in memory addresses within controller memory (e.g., native memory or removable storage media).

Industrial controller 302 can exchange data with the controlled processes $304_1$-$304_N$ through I/O 308, which can comprise one or more local or remote input and/or output modules that communicate with one or more field devices to effect control of the controlled processes $304_1$-$304_N$. The input and/or output modules can include digital modules that send and receive discrete voltage signals to and from the field devices, or analog modules that transmit and receive analog voltage or current signals to and from the devices. The input and/or output modules can communicate with the controller processor over a backplane or network such that the digital and analog signals are read into and controlled by the control program 310. Industrial controller 302 can also communicate with field devices over a network using, for example, a communication module or an integrated networking port. Exemplary networks over which controller 302 can communicate with field devices can include the Internet, Intranets, Ethernet, Ethernet/IP, DeviceNet, ControlNet, Data Highway and Data Highway Plus (DH/DH+), Remote I/O, Fieldbus, Modbus, Profibus, wireless networks, serial protocols, and the like. It is to be appreciated that industrial controller 302 is not limited to the above specifications, and can be any suitable controller used to control an industrial process.

During operation, industrial controller 302 generates or collects real-time data relating to controlled processes $304_1$-$304_N$, such as part counts, temperatures, motor speeds or loads, vibration data, weights, quality test results, alarms, machine states, operator feedback, or other such information. Some of this data is read by the industrial controller 302 directly from field devices (e.g., telemetry devices) associated with the processes themselves, while some data can be generated by control program 310 based on measured process values. The data collected or generated by industrial controller data—raw data 312—can be stored in non-volatile memory associated with the industrial controller 302, or may only exist on a transient basis (e.g., real-time machine state data that only exists within the controller 302 as long as the machine remains in the indicated state, but is not stored in non-volatile memory).

Industrial controller 302 is configured to be cloud-capable, allowing it to connect to a web-based or private cloud platform and utilize cloud-based services hosted thereon (e.g., data storage, analysis, processing, etc.). To this end, industrial controller 302 can include a cloud interface component 314 that couples the industrial controller 302 to the cloud. Cloud interface component 314 can be configured to access the cloud through any suitable hardwired or wireless connection to the Internet (e.g., through a network connection to an Internet server, or through cloud gateway 106 of FIG. 1). In one or more embodiments, cloud interface component 314 can execute an auto-configuration routine that facilitates connection of industrial controller 302 to the cloud. In accordance with this auto-configuration routine, the cloud interface component 314 can provide information to the cloud services about the industrial controller 302 and its context within the overall enterprise or plant hierarchy. For example, when the industrial controller 302 initially interfaces with the cloud during deployment, the cloud interface component 314 can provide such information as a device identifier for the controller; a geographic location of the controller; a location of the controller relative to the greater automation system, plant, or hierarchy to which the controller belongs; indications of other devices or systems in proximity to the controller (e.g., devices communicatively coupled to the controller); diagnostic information for the controller; or other such information that can be used by the cloud services to facilitate integration of the controller within the plant-wide or enterprise-wide system. Once configured, the cloud interface component 314 can push controller data to the cloud and receive data from the cloud services.

The vast amounts of real-time production data often generated by modern industrial facilities, which can operate multiple automation systems having many industrial controllers, can drive up the cost of cloud-based storage or processing applications, or even render some cloud-based industrial applications unfeasible. To overcome or mitigate these constraints, industrial controller 302 can include a transformation component 318 configured to transform raw data 312 generated or collected by the industrial controller 302 into refined data 316 that consumes fewer cloud resources, thereby reducing costs and latency associated with such cloud-based applications. In accordance with determined requirements of the cloud applications being utilized, the transformation component 318 can filter, prune, re-format, aggregate, summarize, or compress the raw data 312 to yield refined data 316. In one or more embodiments, the transformation component 318 can modify the raw data 312 based on an explicit or inferred requirement of the cloud application, user-defined transform profiles instructing how various categories of raw data are to be transformed prior to being pushed to the cloud, and/or contextual metadata that provides context for the raw data. Once the raw data 312 has been modified by the transformation component 318, the cloud interface component 314 can push the refined data 316 to the cloud for storage or for processing by one or more cloud-based applications.

Although FIG. 3 illustrates certain aspects of the present disclosure in connection with an industrial controller, it is to be appreciated that the transformation component 318 and cloud interface component 314 can be implemented on any suitable industrial device that generates or collects data in connection with monitoring or controlling an industrial process. For example, a variable frequency drive (VFD) used in a motor control application can be provided with cloud interface capabilities so that motion control data (e.g., motor speeds, electrical draw, motor positions, overload conditions, etc.) can be pushed to the cloud for storage or analysis. Accordingly, such VFDs can include a transformation component that massages and/or contextualizes the data prior to uploading the data to the cloud. Similarly, telemetry devices (e.g., flow meters, weigh scales, voltage meters, pressure meters, sensors, etc.) can be configured to refine their respective metered data for upload to the cloud. Moreover, in some embodiments, an industrial device can be configured to serve as a proxy for other industrial devices, wherein the proxy device receives raw data from other devices comprising an automation system; aggregates, filters, or summarizes the collected data; and uploads the results to the cloud. In this way, redundant data collected by multiple devices can be identified and streamlined by the proxy device prior to pushing the data to the cloud, reducing bandwidth and storage consumption. These and other exemplary embodiments will be described in more detail below.

Figure 4:
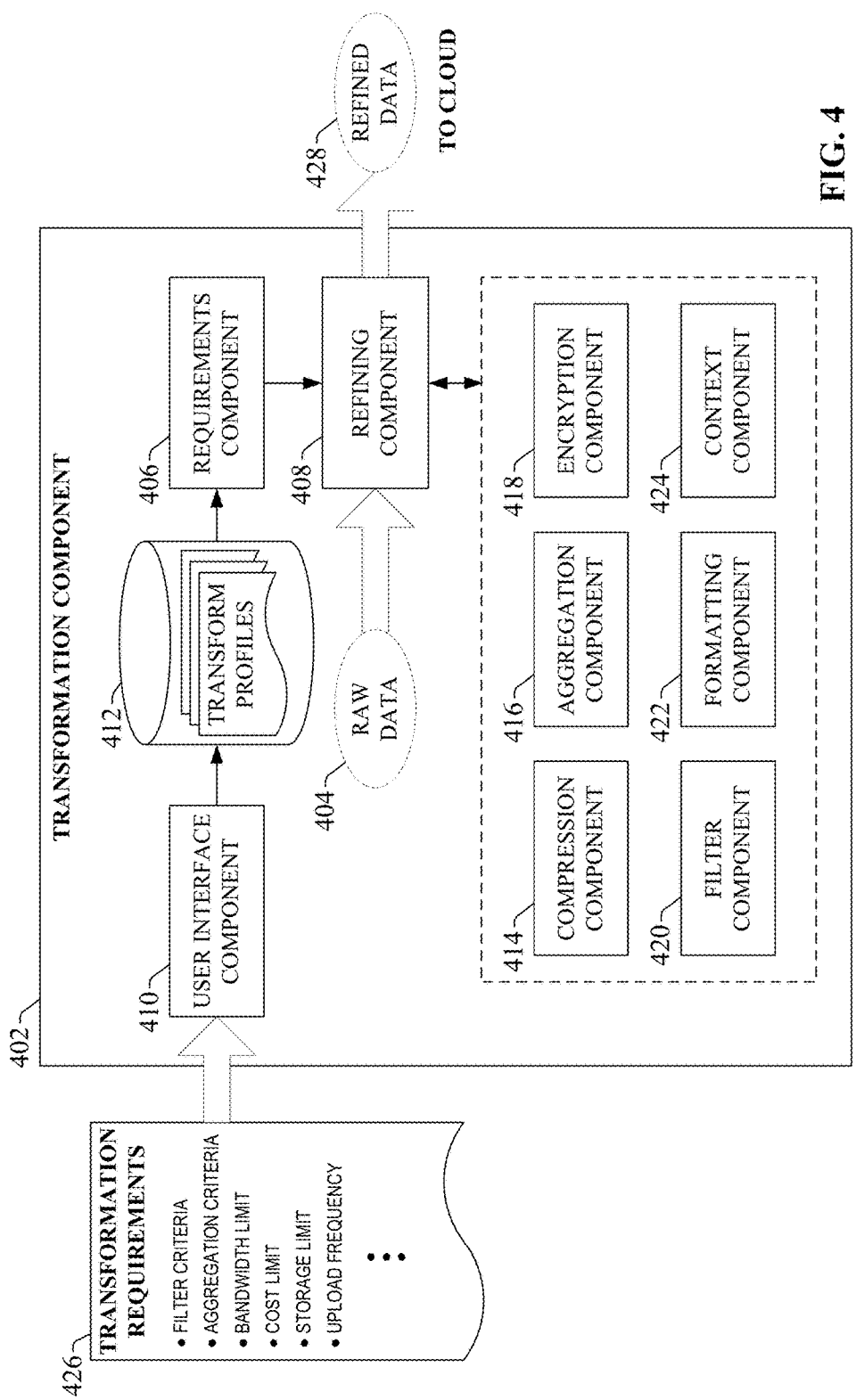
FIG. 4 is a block diagram of an exemplary transformation component for transforming industrial data to refined data in accordance with one or more transformation requirements.

FIG. 4 is block diagram of an exemplary transformation component. As discussed above, transformation component 402 can be incorporated in an industrial device, such as an industrial controller, meter, sensor, motor drive, robot, or other such industrial devices. Transformation component 402 can receive raw data 404 generated or collected by the host industrial device, and modify the raw data 404 into refined data 428 that is better suited to cloud computing applications. The refined data 428 can then be pushed to the cloud by a cloud interface component (e.g., cloud interface component 212 and 314 of FIGS. 2 and 3, respectively), which interfaces the industrial device to the cloud.

Accordingly, transformation component 402 can include a refining component 408 that performs the desired transformation on raw data 404 in accordance with one or more requirements of the cloud-based application. The transformation component 402 can include a requirements component 406 that determines or infers the transformation requirements based on user-defined transformation instructions, requirements specified by the cloud-based application, and/or an inferred requirement or limitation of the cloud. Exemplary transformation requirements can include a required data format or size, a bandwidth limit (e.g., a not-to-exceed bandwidth value), a storage limit, a summarization format, a required update frequency, a metadata requirement (e.g., contextual data that must be added to the data before uploading), a security requirement, or other such criteria. Once the requirements component 406 has determined the user-defined or cloud-side requirements, the requirements component 406 can instruct the refining component 408 to transform the raw data 404 in a manner that satisfies the requirements.

In one or more embodiments, user-defined transformation requirements can be stored as one or more transform profiles 412, which encode sets of transformation requirements 426 that can be read by requirements component 406. A designer can configure the transform profiles 412 via user interface component 410 (similar to user interface component 210 of FIG. 2). Through user interface 410, a user can specify data filtering criteria, data aggregation criteria, a limit on cloud bandwidth, a cost limit (e.g., a daily, weekly, or monthly not-to-exceed cost associated with cloud bandwidth, storage, or processing usage), a storage limit, a data upload frequency, or other such transformation considerations. Transform profiles 412 can also specify category-specific data transformations to be applied to respective categories of industrial data, as will be explained in more detail below.

Refining component 408 can be configured to select one or more suitable transformations to be applied to the raw data 404 from a plurality of transformation types. To this end, transformation component 402 can include one or more of a compression component 414, an aggregation component 416, an encryption component 418, a filter component 420, a formatting component 422, or a context component 424. Compression component 414 can compress the raw data 404 using any suitable data compression algorithm. This can include detection and deletion of redundant data bits, truncation of precision bits, or other suitable compression operations. Aggregation component 416 can combine related data from multiple sources. For example, data from multiple sensors measuring related aspects of an automation system can be identified and aggregated into a single cloud upload packet by aggregation component 416. Encryption component 418 can encrypt sensitive data prior to upload to the cloud. Filter component 420 can filter the raw data 404 according to any specified filtering criterion defined in the transform profiles 412. For example, a transform profile 412 can indicate that pressure values exceeding a defined setpoint are to be filtered out prior to uploading the pressure values to the cloud.

Formatting component 422 can transform any specified subset of the raw data 404 from a first format to a second format in accordance with a requirement of the cloud-based application. For example, a cloud-based reporting application may require measured values in ASCII format. Accordingly, refining component 408 can leverage formatting component 422 to convert a selected subset of the raw data 404 from floating point format to ASCII prior to pushing the data to the cloud-based reporting application. Converting the raw data at the industrial device before uploading to the cloud, rather than requiring this transformation to be performed on the cloud, can reduce the amount of processing load on the cloud side. Context component 424 can append contextual metadata to the raw data, thereby providing the cloud-based services with useful context information for the industrial data. Context metadata can include, but is not limited to, a time/date stamp, a quality value, a location associated with the data (e.g., a geographical location, a production area, etc.), machine statuses at the time the data was generated, or other such contextual information.

Refining component 408 can select one or more of the components 414-424 in connection with transforming raw data 404 into refined data 428 based on determined requirements of the cloud-based services and/or user-defined instructions, as determined by requirements component 406. It is to be appreciated that transformation component 402 is not limited to the transformation operations described above in connection with components 414-424, and that any suitable data transformation is within the scope of certain embodiments of this disclosure.

Figure 5:
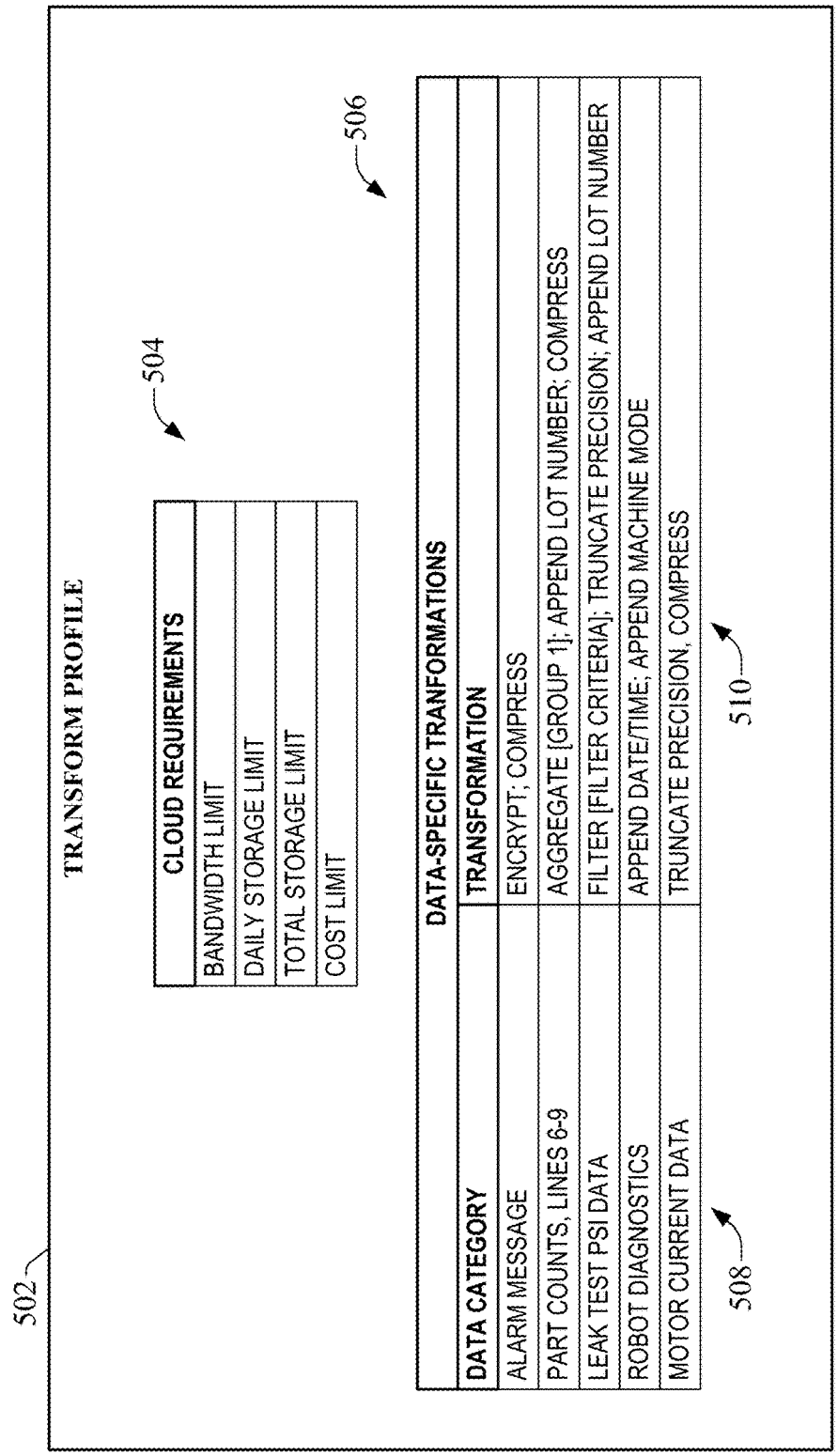
FIG. 5 illustrates an exemplary transform profile.

An exemplary non-limiting transform profile is illustrated in FIG. 5. Transform profile 502 can include one or both of cloud requirements 504 or data-specific transformations 506. Cloud requirements 504 define data requirements or constraints inherent to the cloud platform or cloud-based application with which the industrial device will interact. These can include defined or inferred limits on bandwidth, storage, cost, or other factors. The cloud requirements 504 can be configured manually, specified by the cloud or cloud-based application, or inferred by the cloud data refinement system. In certain embodiments, the transformation component can determine an appropriate data transformation strategy based on the cloud requirements 504. For example, based on a determined volume of data required by the cloud service and the specified bandwidth or storage limits, the transformation component can select an appropriate compression, filtering, summarization, or aggregation strategy that allows the required data to be sent to the cloud without violating the defined constraints.

The cost limit defined in cloud requirements 504 can be used to ensure that the cloud bandwidth and/or storage being utilized by the industrial device does not exceed a specified cost. For example, if a cost associated with different levels of cloud bandwidth or storage utilization is known, the cost limit can be compared with an actual or expected amount of cloud resource usage by the industrial device. The expected usage can be determined based on a current or historical rate at which data is being pushed to the cloud. The transformation component can, in some embodiments, calculate an expected cost associated with the present rate of resource consumption, compare this expected cost with the cost limit defined in cloud requirements 504, and adjust the data transformation strategy based on whether the cost limit is expected to be exceeded.

Transform profile 502 can also define one or more data-specific transformations 506. That is, the transform profile 502 can allow separate transformation strategies to be associated with different categories of data. The exemplary data-specific transformations 506 comprise a set of user-defined data categories 508 and their respective transformation strategies 510. In the illustrated example, alarm messages are configured to be encrypted and compressed prior to being uploaded to the cloud. Part count data for production lines 6-9 are to be aggregated into a group entitled "Group 1," a lot number is to be appended to the part count data, and the data is to be compressed. Leak test pressure data is to be filtered according to defined filtering criteria, the unnecessary precision bits of the pressure values are to be truncated, and a lot number is to be applied. Robot diagnostic data is to be transformed by appending a date/time stamp and a machine mode at the time the diagnostic data was generated. Motor current data is to be truncated and compressed before being pushed to the cloud. By allowing separate transformation strategies to be defined according to data type, the transform profile can allow industrial data to be massaged and customized for cloud-computing applications with a considerable degree of flexibility.

Figure 6:
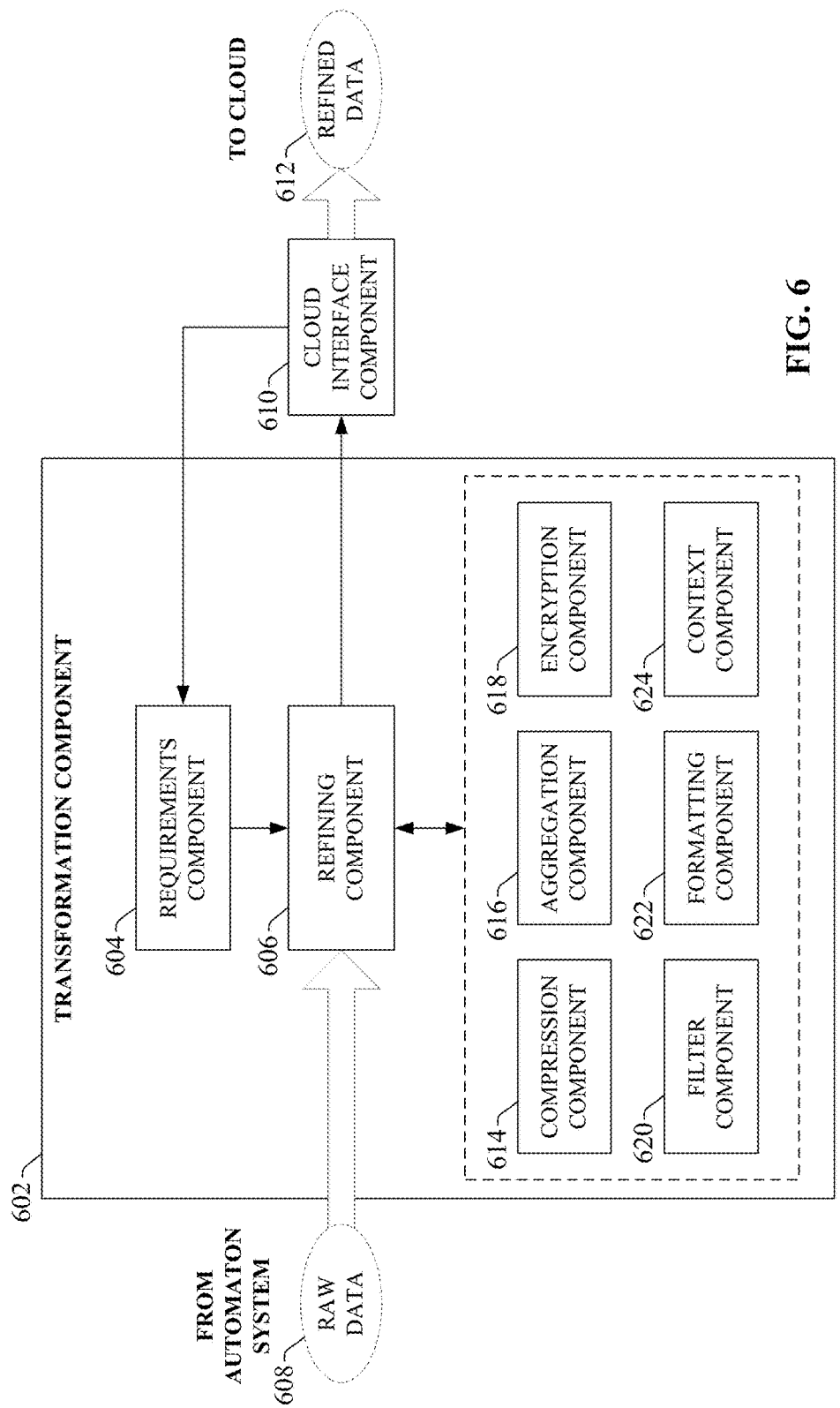
FIG. 6 is a block diagram of an exemplary transformation component capable of transforming industrial data to refined data suitable for cloud computing based on a determined requirement of the cloud.

FIG. 6 is a block diagram of an exemplary transformation component capable of transforming raw industrial data to refined data suitable for cloud computing based on a determined requirement of the cloud. Similar to the exemplary transformation component 402 depicted in FIG. 4, transformation component 602 can include one or more of a compression component 614, an aggregation component 616, an encryption component 618, a filter component 620, a formatting component 622, and a context component 624. These components can be selectively leveraged by refining component 606 to apply a suitable transformation to raw industrial data 608 to yield refined data 612. As in the example depicted in FIG. 4, the refining component 606 selects a suitable transformation based on requirements determined by requirements component 604. In the present example, requirements component 604 can determine or infer a requirement of the cloud that necessitates transformation of the raw data 608 prior to pushing the data to the cloud. For example, requirements component 604 can determine a bandwidth limitation of the cloud connection based on information provided by cloud interface component 610. Accordingly, requirements component 604 may determine that the data must be transformed in such a way as to reduce bandwidth usage below the identified limit, and instruct the refining component 606 to perform a suitable transformation to ensure compliance with the bandwidth limitation (e.g., perform a more lossy data compression on the raw data 608, truncate data values to lower degrees of precision, etc.). In another example, the requirements component 604 may learn from cloud interface component 610 that a cloud-side data storage service is approaching a defined storage setpoint, and may again instruct the refining component 606 to perform a suitable transformation (or to alter a current data transformation strategy) to slow the rate of cloud-based storage consumption based on the determination.

Figure 7:
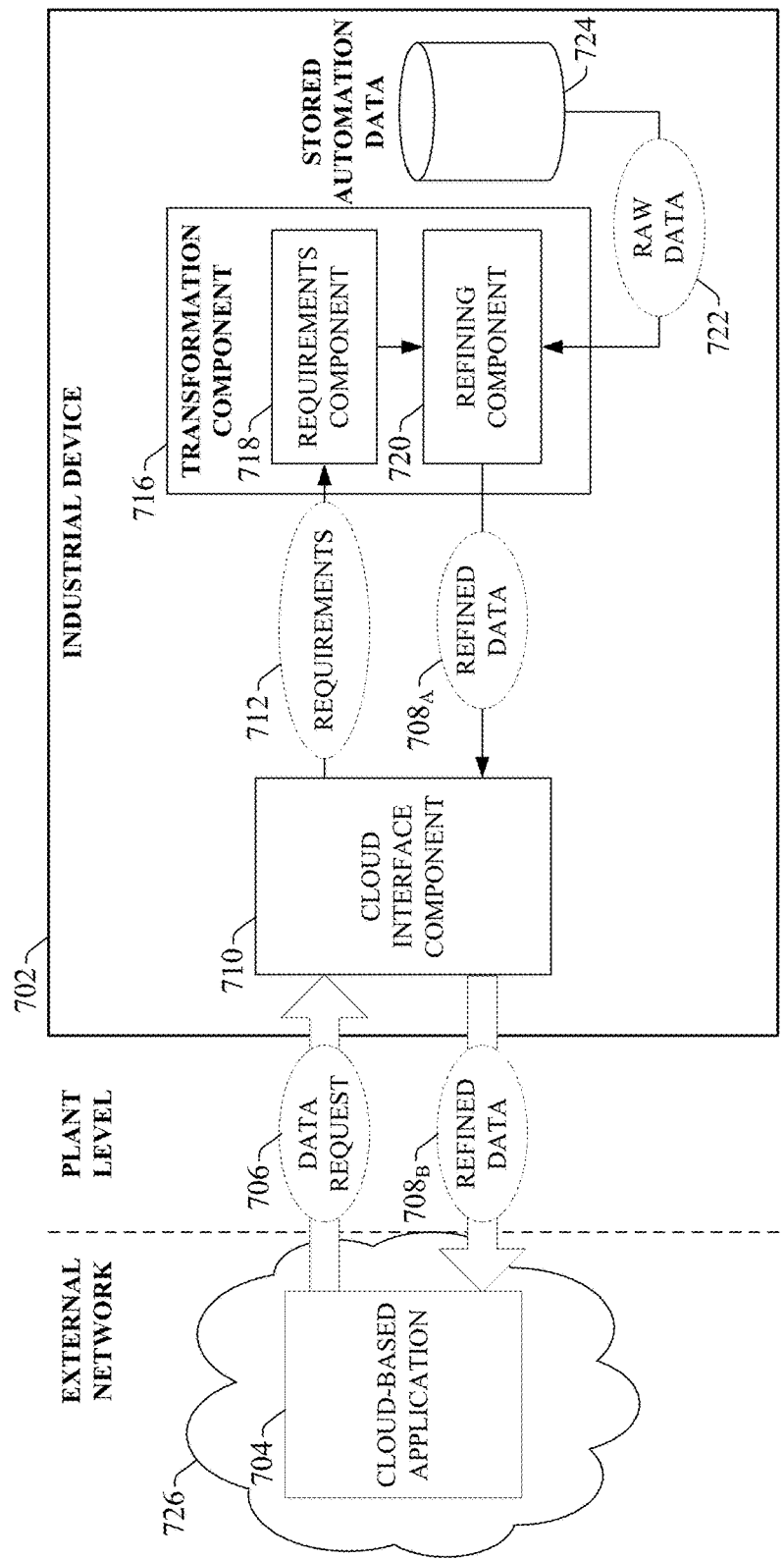
FIG. 7 is a block diagram of an exemplary transformation component capable of transforming industrial data to refined data suitable for cloud computing based on a requirement indicated by a cloud-based application.

FIG. 7 is a block diagram of an exemplary transformation component capable of transforming raw industrial data to refined data suitable for cloud computing based on a requirement indicated by a cloud-based application. As in previous examples, an industrial device 702 can include a transformation component 716 capable of transforming raw data 722 into refined data 714 that facilitates efficient utilization of cloud-based resources. As described above, industrial device 702 can comprise any appropriate device or piece of equipment utilized in connection with monitoring and/or controlling an industrial process, including but not limited to industrial controllers, field devices (e.g., sensors, meters, etc.), motor drives, HMIs, industrial robots, or other such devices. In some embodiments, industrial device 702 can also be a network infrastructure device, such as a firewall, router, or network switch that can interface with the cloud platform to access cloud-based services. Industrial device 702 can also comprise a stand-alone storage device that collects production data from a plurality of controllers, meters, or other industrial devices for storage and subsequent delivery to a cloud-based application for storage or processing.

In the present example, automation data generated or collected by the Industrial device 702 is stored locally in a data storage area 724. Industrial device 702 can push data to and receive data from the cloud platform 726 via cloud interface component 710 (similar to cloud interface components 212, 314, and 610). A cloud-based application 704 can be configured to request and receive data from industrial device 702 for storage, processing, and/or analysis. In some scenarios, cloud-based application 704 can be a cloud-based software or storage service made available to an owner of industrial device 702 by a service provider. For example, cloud-based application 704 may be a virtual machine residing on the cloud platform 726 designed to collect production data from the industrial device 702 and perform analytics on the data. Depending on the application, the cloud-based application 704 can use the results of such analysis to generate reports, providing supplemental control data to the industrial device 702, visualization the production data on other cloud-capable devices (thereby serving as a cloud-based HMI), or perform other suitable tasks. In general, cloud-based application 704 can take the place of local applications that are typically executed on the plant floor or office level of an industrial enterprise and maintained by plant personnel. Providing such applications as a cloud-based service can shift the burden of maintaining these applications (e.g., performing data backups, maintaining backup executables, version control, etc.) from the plant personnel to the software service provider, providing value to the end user.

As in previous examples, transformation component 716 can include a refining component 718 configured to apply a suitable transformation to raw industrial data 722 to yield refined data $708_A$. As in the example depicted in FIG. 4, the refining component 720 selects a suitable transformation based on requirements determined by requirements component 718. In the example depicted in FIG. 7, requirements component 718 receives an indication of the cloud-side requirements 712 from the cloud itself, via cloud interface component 710. For example, cloud-based application 704 may issue a data request 706, requesting a subset of the stored automation data from the industrial device 702. This cloud-side data request 706 can include an indication of a particular data format required by the cloud-based application 704. In some cases, the cloud-based application may require data to be of a particular type (e.g., ASCII, floating point, real, etc.). In other examples, the cloud-based application 704 may request that the data be encrypted prior to being sent to the cloud, may request that the data be enhanced with specific contextual information (e.g., a time stamp, a production line from which the data originated, a machine status or alarm condition in effect at the time the data was generated, etc.) for use by the cloud-based application 704. The requirements component 718 can receive such requirements 712 from the cloud-based application 704 via the cloud interface component 710, and instruct the refining component 720 to transform the requested raw data 722 accordingly. The cloud interface component 710 can then send the resulting refined data $708_B$ to the cloud-based application 704 in response to the initial request.

Figure 8:
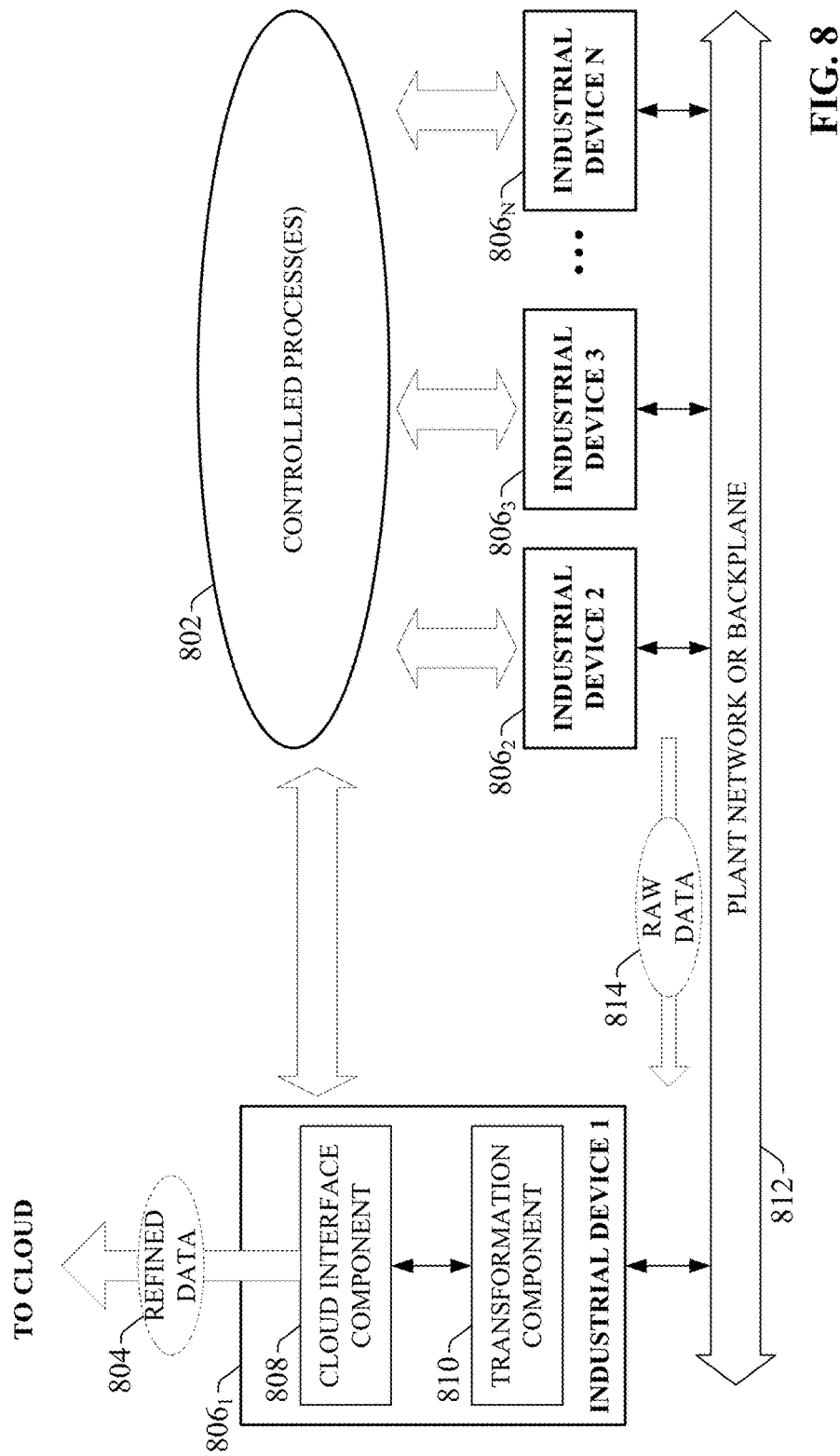
FIG. 8 illustrates an exemplary configuration in which an industrial device acts as a cloud proxy for other industrial devices comprising an automation system.

FIG. 8 depicts a configuration in which an industrial device acts as a cloud proxy for other industrial devices comprising an automation system. An automation system comprises a plurality of industrial devices $806_1$-$806_N$ which collectively monitor and/or control one or more controlled processes 802. The industrial devices $806_1$-$806_N$ respectively generate and/or collect process data relating to control of the controlled process(es) 802. For industrial controllers such as PLCs or other automation controllers, this can include collecting data from telemetry devices connected to the controller's I/O, generating data internally based on measured process values, etc.

In the configuration depicted in FIG. 8, industrial device $806_1$ acts as a proxy for industrial devices $806_2$-$806_N$, whereby raw data 814 from devices $806_2$-$806_N$ is sent to the cloud via proxy industrial device $806_1$. Industrial devices $806_2$-$806_N$ can deliver their raw data 814 to proxy industrial device $806_1$ over plant network or backplane 812 (e.g., a Common Industrial Protocol (CIP) network or other suitable network protocol). Using such a configuration, it is only necessary to interface one industrial device to the cloud (via cloud interface component 808). Accordingly, proxy industrial device $806_1$ can include a transformation component 810 for applying suitable transformations to the collective raw data 814 collected from industrial devices $806_2$-$806_N$, as well as its own control data. The transformed data can then be pushed to the cloud as refined data 804 via cloud interface component 808.

Since data is being gathered from multiple industrial devices according to this configuration, there is a possibility that redundant data may be provided to industrial device $806_1$ from more than one source. Accordingly, transformation component 810 may be configured to filter such redundant data (e.g., using filter component 420 depicted in FIG. 4) prior to delivering the refined data to the cloud-based application. Transformation component 810 may also be configured to summarize the gathered data according to defined summarization criteria prior to delivery to the cloud.

Figure 9:
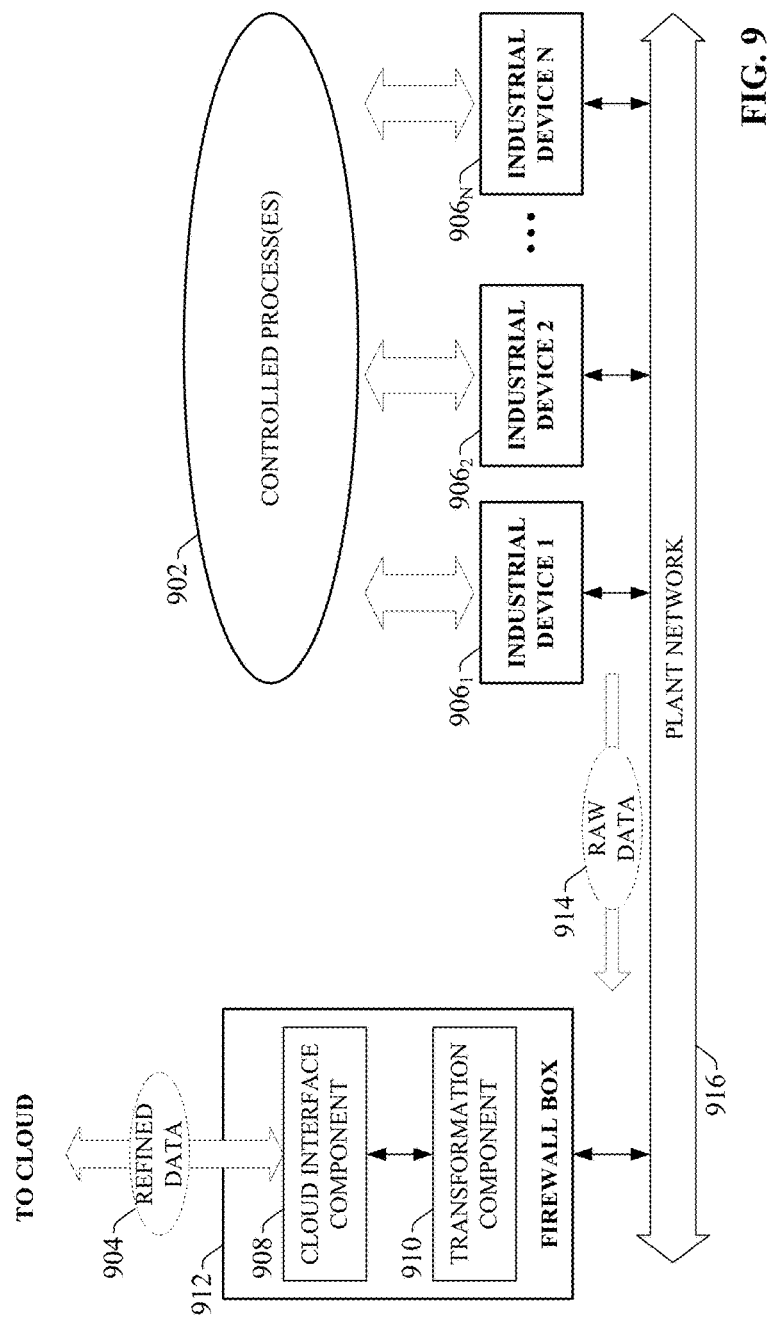
FIG. 9 illustrates a configuration in which a firewall box serves as a cloud proxy for a set of industrial devices.

While the proxy device illustrated in FIG. 8 is depicted as an industrial device that itself performs monitoring and/or control of a portion of controlled process(es) 802, other types of devices can also be configured to serve as a cloud proxies for multiple industrial devices according to one or more embodiments of this disclosure. For example, FIG. 9 illustrates an embodiment in which a firewall box 912 serves as a cloud proxy for a set of industrial devices $906_1$-$906_N$. Firewall box 912 can act as a network infrastructure device that allows plant network 916 to access an outside network such as the Internet, while also providing firewall protection that prevents unauthorized access to the plant network 912 from the Internet. In addition to these firewall functions, the firewall box 912 can include a cloud interface component 908 that interfaces the firewall box 912 with one or more cloud-based services. In a similar manner to proxy industrial device $806_1$ of FIG. 8, the firewall box 912 can collect raw industrial data 914 from industrial devices $906_1$-$906_N$, which monitor and control respective portions of controlled process(es) 902. Firewall box 912 can also include a transformation component 910, which applies suitable transformations to the gathered raw data 914 prior to pushing the data to the cloud-based application as refined data 904. As described in previous examples, these transformations can include, but are not limited to, compression, truncation, summarization, filtering, aggregation, addition of contextual metadata, or other such transformations in accordance with user-defined or cloud-defined requirements. Beneficially, the firewall box depicted in FIG. 9 can allow industrial devices $906_1$-$906_N$ to interact with the cloud platform without directly exposing the industrial devices to the Internet.

In one or more embodiments, the cloud interface component 908 can also receive data from the cloud-based application, and route this data to one or more of the industrial devices $906_1$-$906_N$. For example, the cloud-based service may be an enterprise resource management (ERP) system that analyzes production data in view of one or more defined business goals, and generates production schedule information based on the analysis. Accordingly, firewall box 912 can receive the required production data from industrial devices $906_1$-$906_N$ as raw data 914, transform the production data using transformation component 910, and provide the production data to the cloud-based ERP system as refined data 904. In response, the cloud-based ERP system can analyze the production data and generate updated production schedule information designed to ensure that one or more defined business goals are met (e.g., fulfill a given customer order, maintain total plant energy usage below a defined peak demand, etc.). The cloud-based ERP system can provide this scheduling information to the firewall box 912 (via cloud interface component 908), which can then route the scheduling information to the appropriate industrial devices $906_1$-$906_N$.

Figure 10:
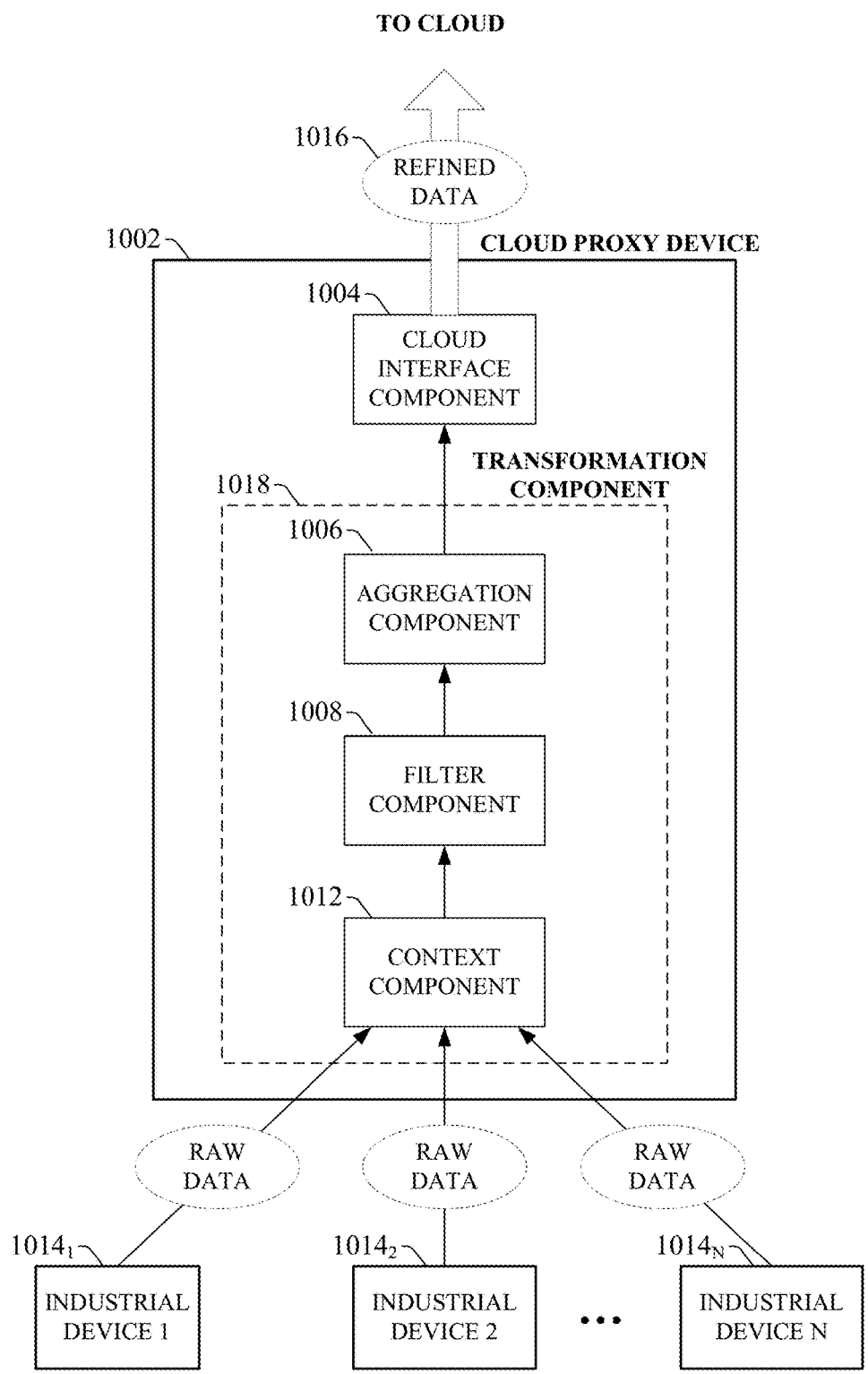
FIG. 10 is a block diagram of an exemplary cloud proxy device.

FIG. 10 illustrates another view of the cloud proxy device according to an exemplary application. Cloud proxy device 1002 can be any suitable device (such as proxy industrial device $806_1$ of FIG. 8 or firewall box 912 of FIG. 9) that gathers raw production data from one or more industrial devices $1014_1$-$1014_N$ and delivers this data to a cloud-based application or service. Cloud proxy device 1002 includes a transformation component configured to transform the raw production data according to a user-defined or cloud-defined requirement, as described in previous examples. In the present example, the cloud proxy device is configured to refine the raw data received from industrial devices $1014_1$-$1014_N$ by appending the data with contextual metadata, apply filtering to remove data not needed by the cloud-based application, and aggregate the remaining data according to defined aggregation criteria. To this end, transformation component 1018 leverages a context component 1012, a filter component 1008, and an aggregation component 1006 to transform the collected raw data to refined data 1016.

Figure 11:
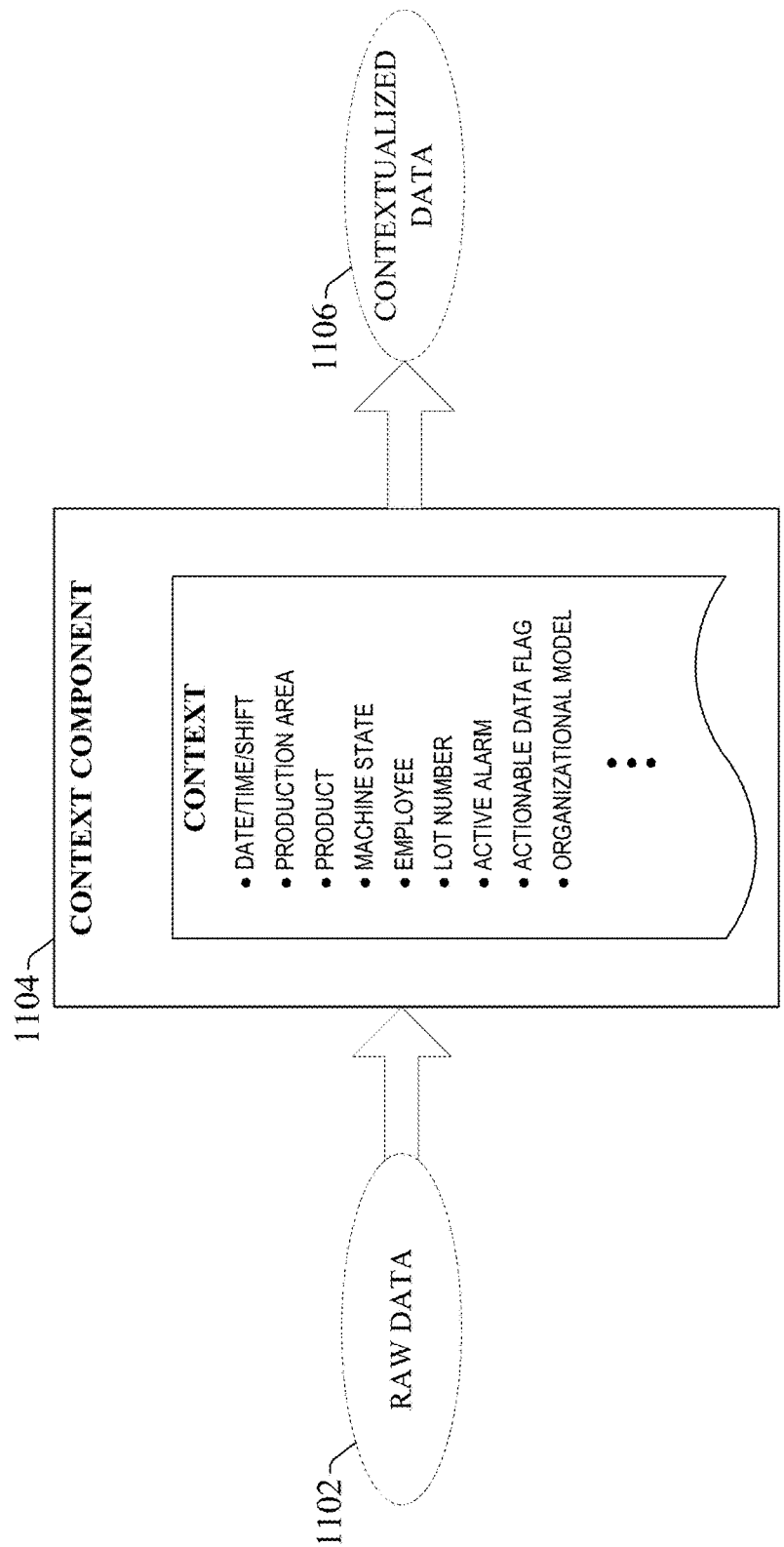
FIG. 11 illustrates an exemplary context component for transforming industrial data into contextualized data.

The context component 1012 can append contextual information or metadata to the raw data. The contextual information provides context for the data, which can be leveraged by subsequent transformation steps or used by the cloud-based application in connection with cloud-side analysis. Turning briefly to FIG. 11, an exemplary context component for transforming raw data into contextualized data is illustrated. Context component 1104 receives raw production data 1102 and enhances the raw data 1102 with one or more pieces of context data to yield contextualized data 1106. For example, context component 1104 can apply a time stamp to the raw data 1102 indicating a time, a date, and/or a production shift when the data was generated. The applied context data may also include a production area that yielded the data, a particular product that was being produced when the data was generated, and/or a state of a machine (e.g., auto, semi-auto, abnormal, etc.) at the time the data was generated. Other examples of context information include an employee on shift at the time the data was generated, a lot number with which the data is associated, or an alarm that was active at the time the data was generated. Context component 1104 can also apply an actionable data tag to the raw data if it is determined that the data requires action to be taken by plant personnel or by the cloud-based application. Such actionable tags are discussed in more detail below.

Context component 1104 an also apply contextual information to the raw data 1102 that reflects the data's location within a hierarchical organizational model. Such an organization model can represent an industrial enterprise in terms of multiple hierarchical levels. In an exemplary organizational model, the hierarchical levels can include—from lowest to highest—a workcell level, a line level, an area level, a site level, and an enterprise level. Devices that are components of a given automation system can be described and identified in terms of these hierarchical levels, allowing a common terminology to be used across the entire enterprise to identify devices, machines, and data within the enterprise. In some embodiments, the organizational model can be known to the context component 1104, which can stamp the raw data 1102 with a hierarchical identification tag that indicates the data's origin within the organizational hierarchy (e.g., Company:Marysville:DieCastArea:#1Headline:LeakTestCell).

Returning to FIG. 10, after the context component 1012 has added contextual information to the raw data, filter component 1008 can determine which of the contextualized data is to be pushed to the cloud, and discard data that is not required by the cloud-based service. Similar to the filter component 420 described in connection with FIG. 4, filter component 1008 can filter the contextualized data according to any specified filtering criterion. In some embodiments, filtering criteria can be defined in a transform profile associated with the transformation component 1018. Exemplary filtering criteria can include instructions to discard certain types of data if the data exceeds (or falls below) a defined setpoint. For example, the filtering criteria can specify that weight data collected from a testing device of a particular workcell is to be discarded if the data exceeds a maximum weight value indicative of a faulty reading. In such scenarios, the data to which this filter criterion is to be applied can be identified based on the contextual information applied to the data by the context component 1012. Filter component 1008 can also be configured to identify redundant data collected from two or more of the industrial devices $1014_1$-$1014_N$, and discard redundant instances of the same data. Again, filter component 1008 can leverage the contextual information applied by the context component 1012 to identify instances of redundant data.

Transformation component 1018 can also include an aggregation component 1006 configured to combine related data according to one or more predefined aggregation instructions. For example, once the raw data from industrial devices $1014_1$-$1014_N$ has been contextualized and filtered by the context component 1012 and the filter component 1008, aggregation component can identify related data, which may originate from multiple data sources, and combine the related data into a common upload for delivery to a cloud-based service or application. The resulting refined data 1016 can be pushed to the cloud via cloud interface component 1004.

While the exemplary transformation component 1018 of FIG. 10 is described as including a context component 1012, a filter component 1008, and an aggregation component 1006, it is to be appreciated that the transformation component 1018 integrated with cloud proxy device 1002 can include any suitable combination of data refinement functions, according to the needs of the user and the requirements of the particular cloud-based services being used. For example, transformation component 1018 may compress, encrypt, and/or reformat the collected raw data prior to pushing the data to the cloud-based service.

Figure 12:
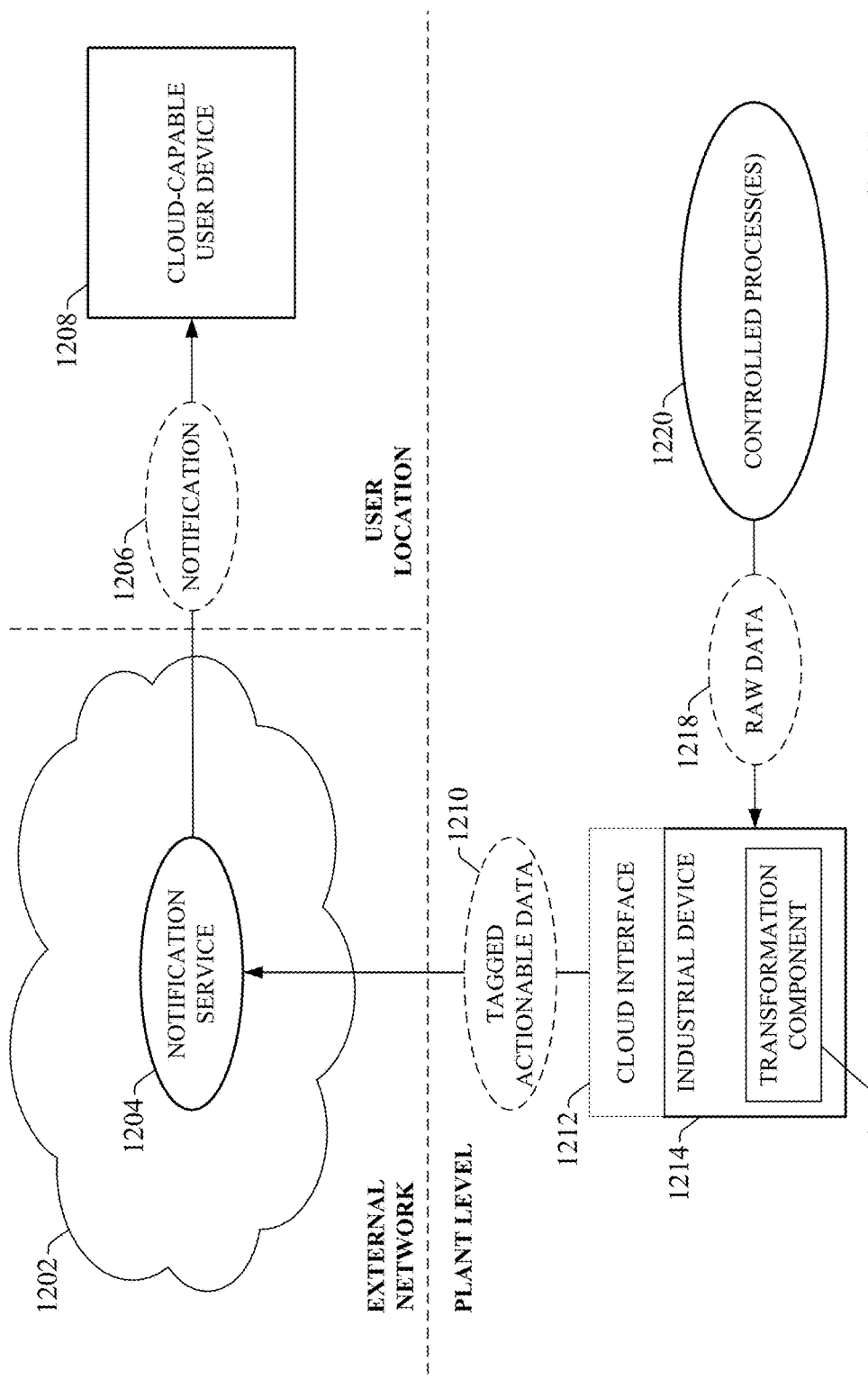
FIG. 12 is a block diagram of an exemplary notification architecture.

As mentioned above, one or more embodiments set forth in this disclosure can apply an actionable data tag to raw data prior to uploading the data to the cloud. Such actionable data tags can be used by cloud-based notification services to notify relevant personnel that an action is required in response to a detected event. FIG. 12 illustrates an exemplary notification architecture according to one or more embodiments of this disclosure. In this example, one or more controlled processes 1220 are monitored and/or controlled by industrial device 1214, which can be an industrial controller, a sensor, a meter, a motor drive, or other such device. Alternatively, industrial device 1214 may be a separate device (e.g., a proxy device) that is not directly involved in monitoring or controlling the controlled process(es) 1220, but instead collects raw process data from industrial devices involved with controlling the controlled process(es) 1220, and delivers this data to the cloud. In such embodiments, industrial device 1214 can be, for example, a firewall box as described in connection with FIG. 9 or other such network infrastructure device, a data collection server, or other suitable device capable of collecting or generating industrial data and providing this data to the cloud.

As in previous examples, industrial device 1214 collects raw data 1218 from controlled process(es) 1220, or generates process data internally based on monitored conditions of the controlled process(es) 1220. Industrial device 1214 includes a transformation component 1216 that transforms the raw data 1218 into refined data according to requirements of a particular cloud-based application or service. In the present example, the cloud-based service is a notification service 1204 that runs on a cloud platform 1202. Notification service 1204 can be a subscription service designed to receive tagged actionable data 1210 from a customer's plant floor equipment, and to route notifications 1206 to appropriate plant personnel in accordance with the actionable data.

Transformation component 1216 can tag the raw data with an actionable tag according to one or more predefined tagging conditions. These can include such conditions as detecting that a particular process value has exceeded a defined setpoint, detecting a transition to a particular machine state, detecting an alarm condition, determining that a specified production goal has been achieved, or other such conditions that can be detected through analysis of the raw data 1218. When the industrial device 1214 detects an actionable condition within a subset of the raw data 1218, transformation component can append the relevant data with an actionable tag that will indicate to the notification service 1204 that personnel are to be notified. The actionable tag can include information identifying one or more specific plant personnel who are to receive the notification, as well as information identifying a user notification device, phone number, or email address for each person to be notified.

Figure 13:
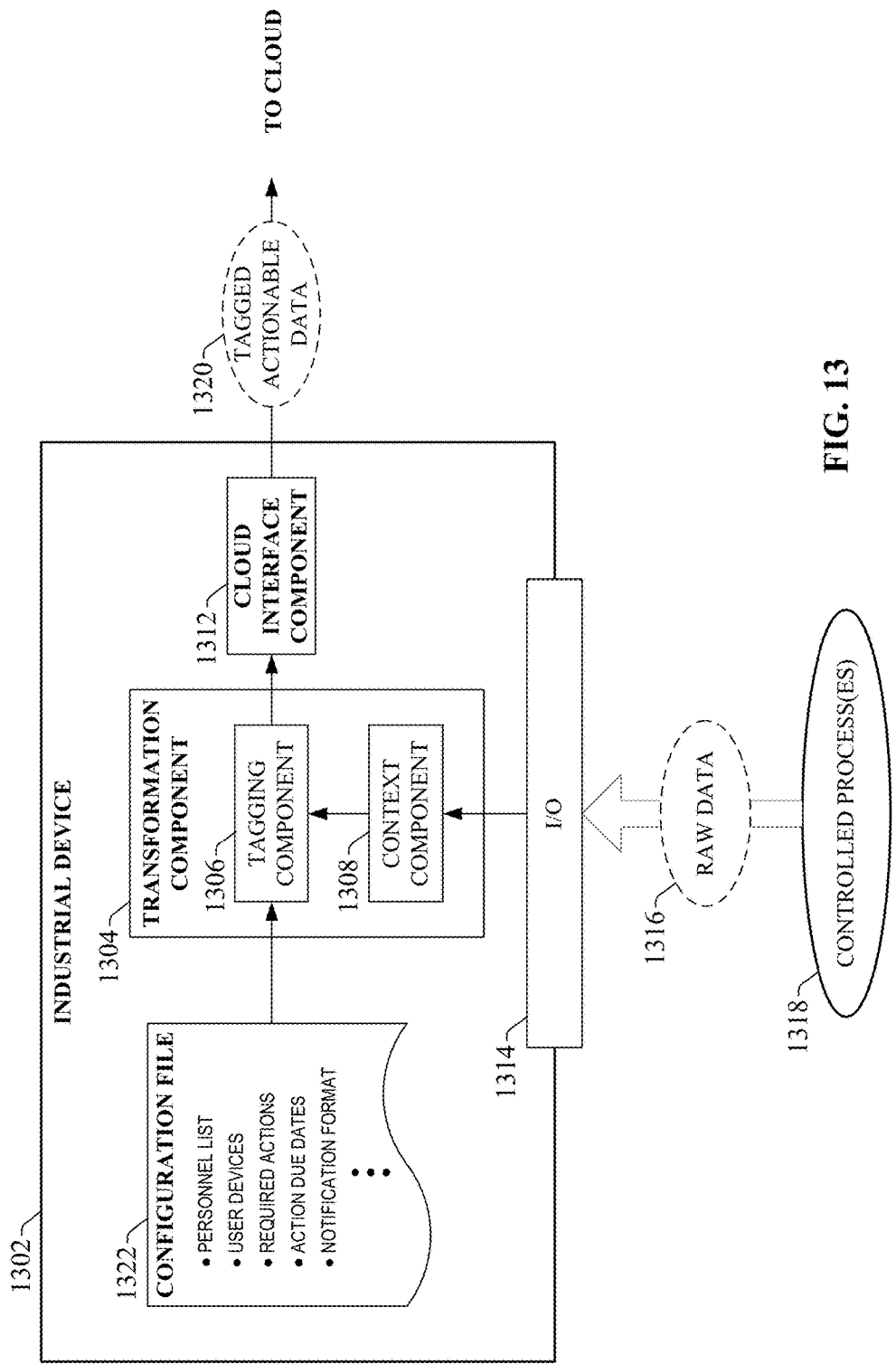
FIG. 13 is a block diagram of an industrial device having a transformation component for tagging actionable industrial data with notification information.

In one or more embodiments, the transformation component 1216 can determine the information to include in the actionable data tag by cross-referencing a configuration file that identifies which personnel are to be notified for a given type of condition, one or more notification methods for each identified person, and/or other relevant information. Turning briefly to FIG. 13, a more detailed illustration of the transformation component is depicted. Transformation component 1304 of industrial device 1302 can include a tagging component 1306 and a context component 1308. Similar to context component 1104 described in connection with FIG. 11, context component 1308 can append contextual information to the raw data 1316 read from controlled process(es) 1318 (e.g., through I/O 1314 of the industrial device 1302). If the industrial device 1302 determines that a subset of the resulting contextualized data requires action to be taken by plant personnel, tagging component 1306 can reference a configuration file 1322 to determine, for example, which personnel should be notified, which user devices should receive the notification, a required action to be taken by the recipient, a due date for the action, a format for the notification (e.g., email, text message, text-to-voice, etc.), and/or other relevant information. Configuration file 1322 can maintain multiple separate personnel lists respectively associated with different types of actionable situations. In some embodiments, the personnel list selected for a given notification can be at least partly a function of the context data appended by context component 1308. For example, if raw data 1316 indicates that a process parameter has exceeded a setpoint value, the tagging component 1304 can identify the list of personnel to receive the notification based on the area or workcell to which the process parameter relates. The industrial device 1302 can then send the resulting tagged actionable data 1320 to the cloud via cloud interface component 1312.

Returning to FIG. 12, after the transformation component 1216 creates the actionable data from raw data 1218, the industrial device sends the tagged actionable data 1210 to the cloud via cloud interface 1212, which is configured to exchange data with cloud-based notification service 1204. Notification service 1204 can identify the received data as actionable data, determine the notification destinations by reading the actionable tag appended by the transformation component 1216, and deliver notifications 1206 to one or more notification destinations. The notification 1206 can be a delivered to cloud-capable user device 1208, such as a phone, a tablet computer, a desktop computer, or other suitable devices.

Figure 14:
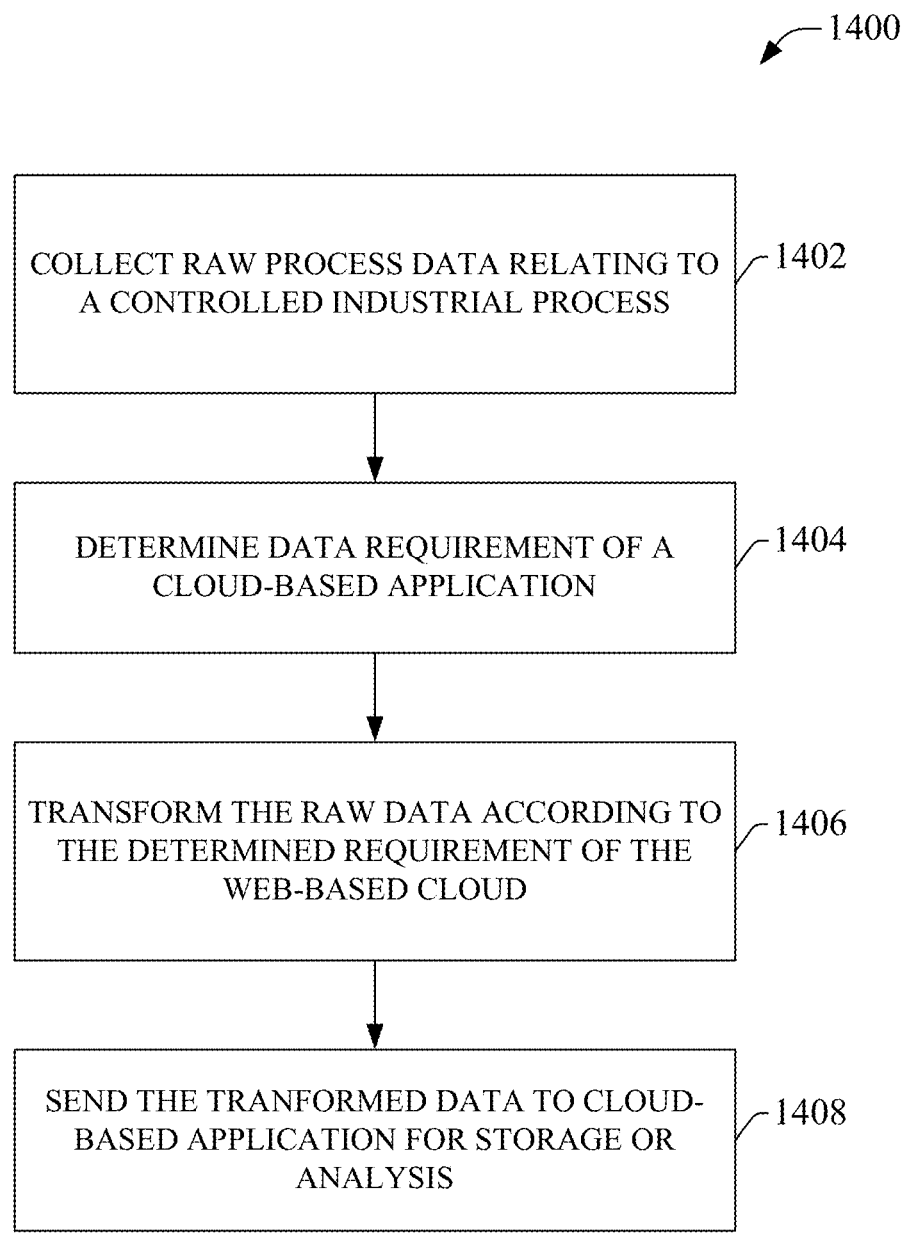
FIG. 14 is a flowchart of an example methodology for transforming industrial data into refined data amenable for cloud-based storage or analysis.
Figure 15:
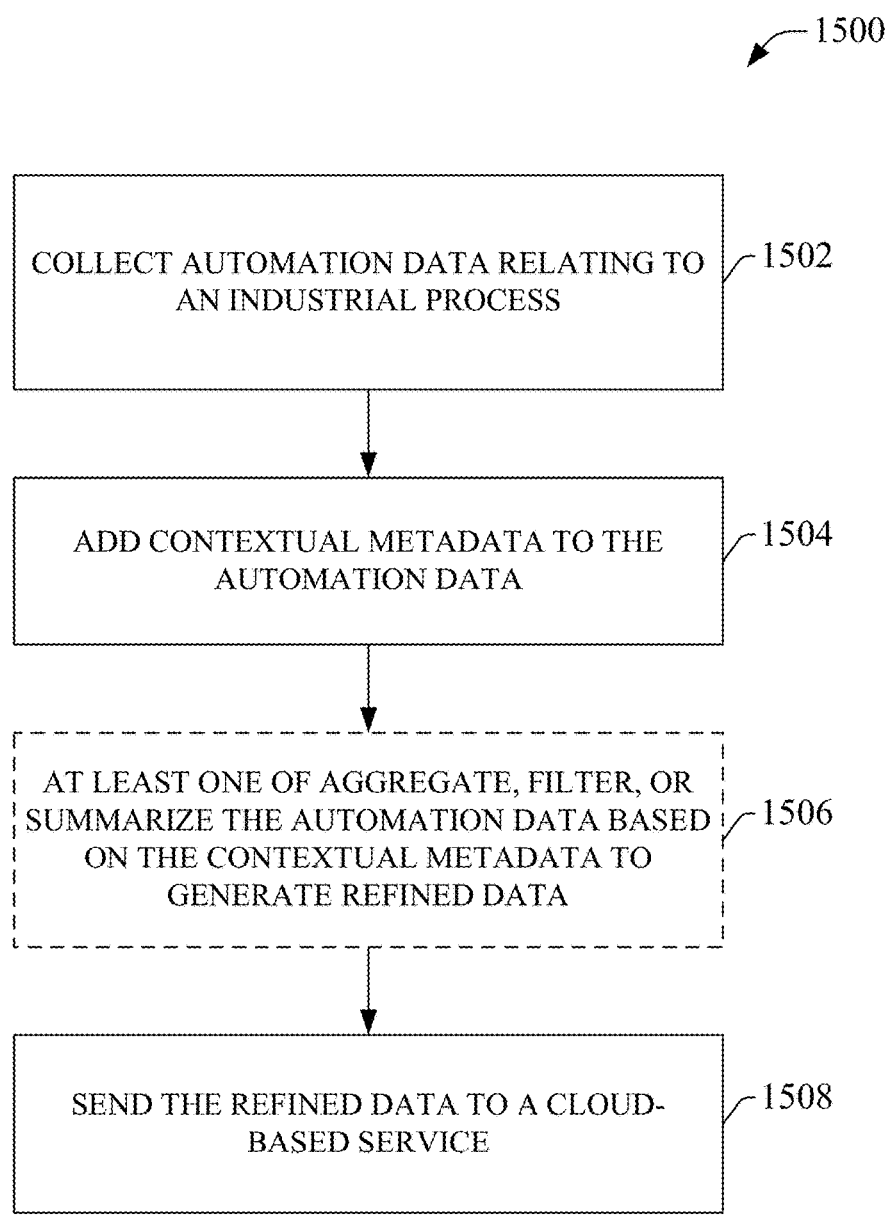
FIG. 15 is a flowchart of an example methodology for contextualizing and refining data in preparation for delivery to a cloud-based application.
Figure 16:
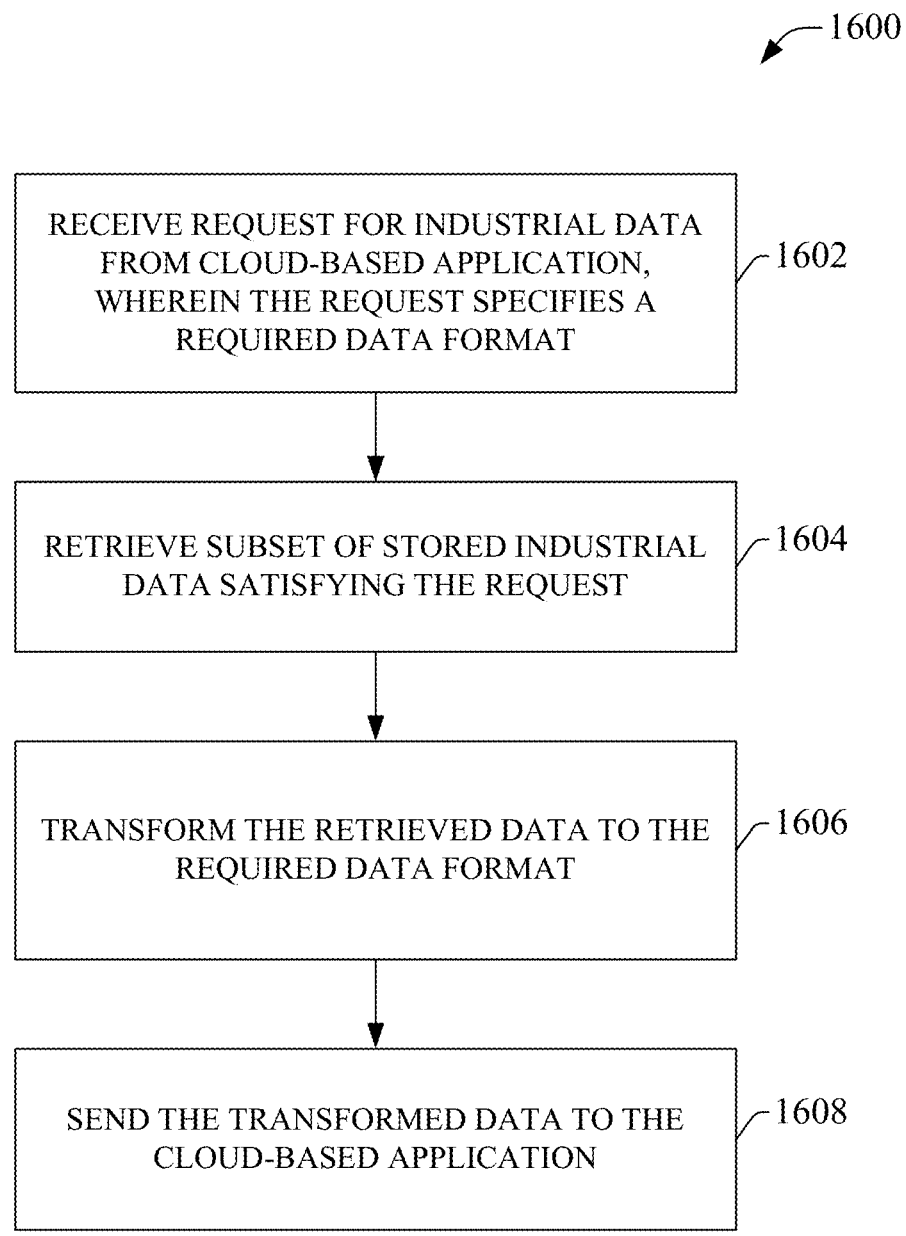
FIG. 16 is a flowchart of an example methodology for sending refined industrial data to a cloud application in a requested format.

FIGS. 14-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for transforming raw industrial data into refined data amenable for cloud-based storage or analysis. At 1402, raw process data relating to a controlled industrial process is collected or generated. Such raw data can be collected, for example, by an industrial controller via the controller's local or remote I/O, or can be generated by the controller based on measured telemetry values and statuses of the controlled process. The raw data can also be collected by a networked data collection device that receives the raw data from one or more industrial devices (e.g., controllers, meters, drives, etc.).

At 1404, one or more data requirements of a cloud platform or cloud-based application are determined. Exemplary requirements can include a required data format or size, a bandwidth limit (e.g., a not-to-exceed bandwidth value), a storage limit, a summarization format, a required update frequency, a metadata requirement (e.g., contextual data that must be added to the data before uploading), a security requirement, or other such criteria.

At 1406, the raw data is transformed according to the one or more requirements of the cloud-based application determined at step 1404. This can include one or more of compressing the raw data, aggregating data according to predefined aggregation criteria, encrypting the data, filtering redundant or suspicious data, reformatting the data to a format required by the cloud-based application, adding contextual information to the data, or other suitable data transformations. At 1408, the resulting transformed data is sent to the cloud-based application for storage or analysis.

FIG. 15 illustrates an example methodology 1500 for contextualizing and refining data in preparation for delivery to a cloud-based application. At 1502, automation data is collected from an industrial process. At 1504, contextual metadata is added to the collected automation data. The contextual metadata can include, but is not limited to, a time/date stamp, a location associated with the data (e.g., a geographical location, a production area, etc.), machine statuses at the time the data was generated, personnel on duty at the time the data was generated, a hierarchical identifier indicating a source of the data within a hierarchical organizational hierarchy, or other such contextual information.

In some cases, additional processing of the contextualized data may be desired prior to delivering the data to the cloud. Accordingly, at optional step 1506, the automation data is at least one of aggregated, filtered, or summarized based on the contextual metadata. For example, subsets of the automation data having a similar context (e.g., a same location, production area, work shift, etc.) can be aggregated together for subsequent delivery to the cloud. In another example, it may be determined that a particular cloud-based application only requires data relating to a particular workcell. Accordingly, portions of the automation data whose contextual metadata indicates that the data originates from other workcells can be filtered or discarded. Summaries can also be generated using the collected automation data based on the contextual metadata (e.g., aggregate data from a selected plant facility and summarize the production statistics for the respective work areas in that facility). At 1508, the refined data produced by steps 1502-1506 is sent to a cloud-based service for storage or for processing by a cloud-based application.

FIG. 16 illustrates an example methodology 1600 for sending refined industrial data to a cloud application in a requested format. At 1602, a request for industrial data is received from a cloud-based application. In one or more embodiments, the request can be received by an industrial device, such as a controller, having the requested data stored thereon. In other embodiments, the request can be received by a stand-alone data collection device that collects and stores automation data generated by industrial devices on the plant floor. The request may also be received by a cloud-capable network infrastructure device, such as a firewall box, that resides on a common plant network (e.g., a CIP network) with other industrial devices. The request from the cloud-based application can specify a required data format for the requested data.

At 1604, a subset of stored industrial data satisfying the request is retrieved. At 1606, the retrieved data is transformed to the data format specified by the initial request. For example, a cloud-based reporting application may request a set of process values in ASCII format. Accordingly, a transformation component on the industrial device can convert the requested subset of stored data from floating point format to ASCII prior to pushing the data to the cloud-based reporting application. In another example, a cloud-based reporting application that collects data from a mobile system may require that data is tagged with location information specifying a location of origin for the data. Accordingly, the transformation component can append the requested data with GPS information in response to the request. Other suitable data transformations are within the scope of one or more embodiments of this disclosure. At 1608, the transformed data is sent to the cloud-based application; e.g., using a cloud interface component or gateway.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
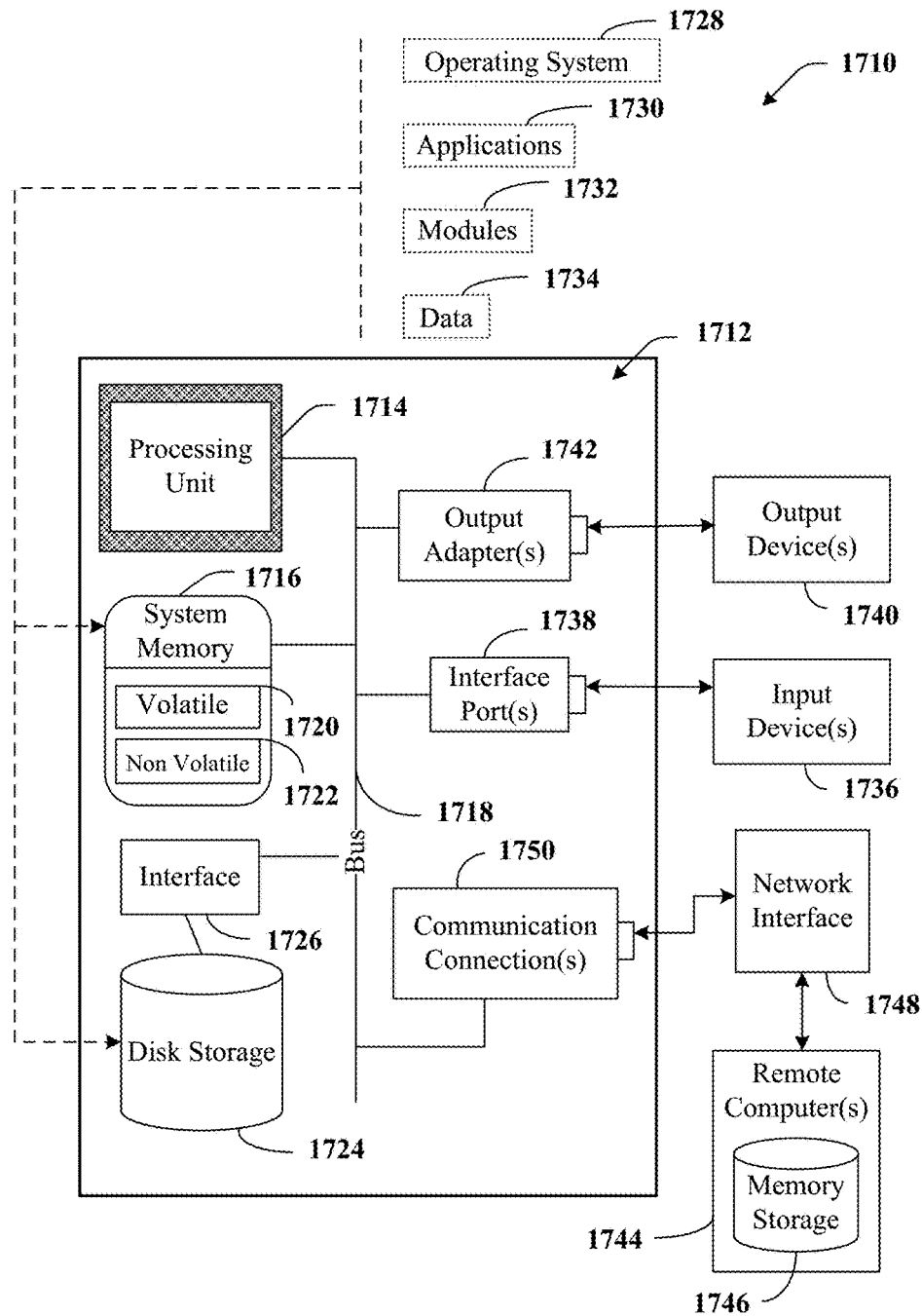
FIG. 17 is an example computing environment.
Figure 18:
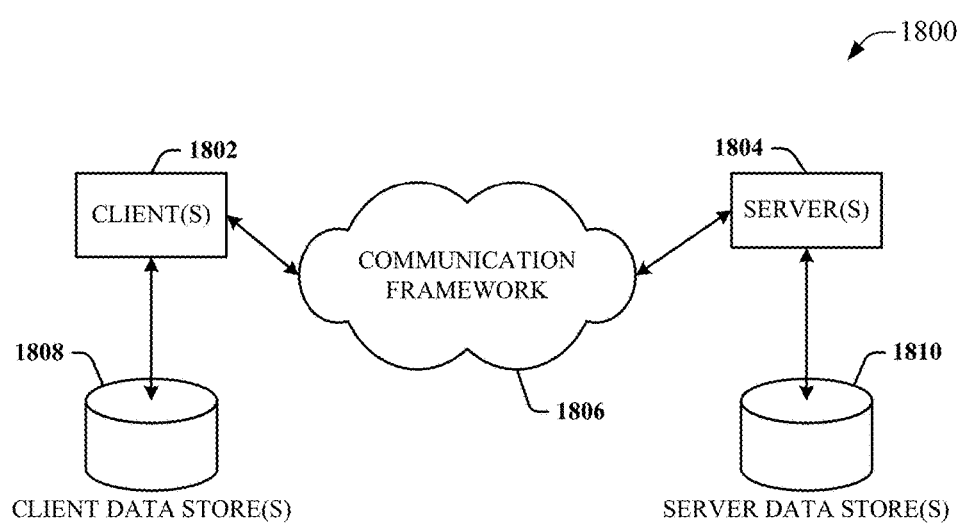
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented.

With reference to FIG. 17, an example environment 1710 for implementing various aspects of the aforementioned subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Multi-core microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable PROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that one or more embodiments of the subject disclosure can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

FIG. 18 is a schematic block diagram of a sample-computing environment 1800 with which the disclosed subject matter can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing one or more embodiments as described herein, for example. One possible communication between a client 1810 and a server 1830 can be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the servers 1830.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. An industrial controller, comprising:
a memory that stores executable components;
a processor operatively coupled to the memory that executes the executable components, the executable components comprising:
 a component that executes an industrial control program, wherein execution of the industrial control program causes the industrial controller to process input signals from industrial input devices of an automation system and to control output signals directed to industrial output devices of the automation system;
 a component that generates and collects data generated by an industrial automation event, activity, or process implemented by the industrial input devices and the industrial output devices;
 a cloud interface component that communicatively couples the device to a web-based cloud; and
 a transformation component that transforms the data into refined data for processing by the web-based cloud according to a determined requirement of the web-based cloud, wherein the transformation component appends contextual metadata to the data, the contextual metadata comprising at least an identity of a site and a production area from which the data originates, an identity of a product being produced at a time the data was generated, a quality indicator for the product, and an actionable tag,
wherein
 the transformation component determines the identity of the site and the production area based on a referencing of a hierarchical organizational model of an industrial enterprise that includes at least an enterprise level, a site level, and a production area level, and the cloud interface component sends the refined data to a cloud-based application running on the web-based cloud to notify a user in accordance with the actionable tag.

2. The device industrial controller of claim 1, wherein the identity of the site and the production area indicates an origin of the data within a hierarchical organization model of the industrial enterprise.

3. The industrial controller of claim 1, wherein the cloud interface component is further configured to send information about the industrial controller to the web-based cloud in connection with a device configuration routine, and wherein the information comprises at least one of a device identifier, a geographic location of the industrial controller, a location of the industrial controller relative to at least one other device within a plant hierarchy, identification of one or more other devices in proximity to the industrial controller, or diagnostic information for the industrial controller.

4. The industrial controller of claim 1, wherein the transformation component is further configured to append other contextual metadata to the data, the other contextual metadata identifying at least one of a date and a time that the data was generated, a shift at the time the data was generated, an employee on shift at the time that the data was generated, a lot number, an alarm active at the time that the data was generated, or a state of a machine at the time the data was generated.

5. The industrial controller of claim 4, wherein the cloud interface component is further configured to receive a request from the cloud-based application to append the other contextual metadata to the data, and the transformation component is configured to append the other contextual metadata in response to receipt of the request.

6. The industrial controller of claim 5, wherein the cloud-based application is at least one of a notification application, a business intelligence application, a visualization application, a reporting application, a storage application, or an enterprise resource planning (ERP) application.

7. The industrial controller of claim 1, wherein the transformation component is further configured to at least one of compresses, aggregates, encrypts, filters, or re-formats the data to yield the refined data.

8. The industrial controller of claim 1, wherein the transformation component is configured to tag the data with the actionable tag in response to determining that a value contained in the data is indicative of at least one of an alarm condition or an achieved production goal.

9. The industrial controller of claim 8, wherein the transformation component is further configured to tag the data with notification information specifying at least one of an employee to be notified, a destination device to which a notification is to be sent, a required action, a due date for the required action, or a format for the notification.

10. A method for transforming industrial data, comprising:
executing, by an industrial device comprising at least one processor, an industrial control program, wherein the executing causes the industrial device to process input signals from input devices and to control output signals directed to output devices;
generating and collecting, by the industrial device, industrial data generated via control of an industrial process via the input devices and the output devices;
determining, by the industrial device, a plant site identifier and a production area identifier associated with the industrial data based on a referencing of a hierarchical organizational model of an industrial enterprise that defines at least an enterprise level, a site level, and a production area level;
transforming, by the industrial device, the industrial data into refined data in accordance with a requirement of a cloud-based application, wherein the transforming comprises at least adding contextual information to the industrial data, the contextual information comprising at least an actionable tag, the plant site identifier, the production area identifier, an identity of a product being produced at a time that the industrial data was generated, and a quality indicator for the product; and
transferring, by the industrial device, the refined data to the cloud-based application to facilitate notifying a user in accordance with the actionable tag.

11. The method of claim 10, further comprising sending, by the industrial device, information about the industrial device to the cloud-based application as part of a device configuration routine, and wherein the information comprises at least one of a device identifier, a geographic location of the industrial device, a location of the industrial device relative to at least one other device within a plant hierarchy, identification of one or more other devices in proximity to the industrial device, or diagnostic information for the industrial device.

12. The method of claim 10, further comprising adding, by the industrial device, other contextual information to the industrial data, the other contextual information comprising at least one of a date and a time that the industrial data was produced, a shift at the time the industrial data was produced, an employee on shift at the time that the industrial data was produced, a lot number, an alarm active at the time that the industrial data was produced, and a state of a machine at the time the industrial data was produced.

13. The method of claim 12, wherein the adding the other contextual information comprises adding the other contextual information in response to receiving a request from the cloud-based application to add the other contextual information to the industrial data.

14. The method of claim 13, wherein the receiving the request comprises receiving the request from at least one of a notification application, a business intelligence application, a visualization application, a reporting application, a storage application, or an enterprise resource planning (ERP) application.

15. The method of claim 10, further comprising at least one of compressing, aggregating, encrypting, filtering, or re-formatting the industrial data by the industrial device to yield the refined data.

16. The method of claim 10, wherein the transforming comprising adding the actionable tag to the industrial data in response to determining that a value contained in the industrial data is indicative of at least one of an alarm condition or an achieved production goal.

17. The method of claim 16, further comprising tagging, by the industrial device, the industrial data with notification information specifying at least one of an employee to be notified, a destination device to which a notification is to be sent, a required action, a due date for the required action, or a format for the notification.

18. A non-transitory computer-readable medium having stored thereon computer-executable instructions that, in response to execution, cause a computing device to perform operations, comprising:
executing an industrial control program, wherein the executing causes the computing device to process input signals from industrial input devices and to control output signals directed to industrial output devices;

transforming data generated by the executing into refined data in accordance with a requirement of an application executing on a cloud platform, wherein the transforming comprises at least referencing a hierarchical organizational model of an industrial enterprise that includes at least an enterprise level, a site level, and a production area level, determining, based on the referencing, a plant site identifier and a production area identifier representing an origin of the data, and adding contextual data to the data, the contextual data comprising at least the plant site identifier, the production area identifier, an identity of a product being produced at a time that the data was generated, a quality indicator associated with the product, and an actionable tag;

establishing a connection to the application via the cloud platform; and sending the refined data to the application on the cloud platform to facilitate notifying a user in accordance with the actionable tag.

19. The non-transitory computer-readable medium of claim 18, wherein the operations further comprise adding other contextual data to the data, the other contextual data comprising at least one of a date and a time that the data was generated, a shift at the time the data was generated, an employee on shift at the time that the data was generated, a lot number, an alarm active at the time that the data was generated, and a state of a machine at the time the data was generated.

20. The non-transitory computer-readable medium of claim 19, wherein the adding the other contextual data comprises adding the other contextual data in response to receiving a request from the application to add the other contextual data to the data.

* * * * *